(12) United States Patent
Cheng

(10) Patent No.: US 7,200,532 B1
(45) Date of Patent: Apr. 3, 2007

(54) SUBDIVISION SURFACE-BASED GEOMETRIC MODELING SYSTEM

(75) Inventor: Fuhua Cheng, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 635 days.

(21) Appl. No.: 10/462,297

(22) Filed: Jun. 16, 2003

Related U.S. Application Data

(60) Provisional application No. 60/388,637, filed on Jun. 14, 2002.

(51) Int. Cl.
*G06F 17/10* (2006.01)

(52) U.S. Cl. ............... 703/2; 703/1; 703/6; 703/13; 345/419; 345/420; 345/421; 345/423

(58) Field of Classification Search ............... 703/1, 703/2, 6; 345/420–423
See application file for complete search history.

(56) References Cited

U.S. PATENT DOCUMENTS

| | | | | |
|---|---|---|---|---|
| 5,889,524 | A * | 3/1999 | Sheehan et al. | 345/419 |
| 6,037,949 | A * | 3/2000 | DeRose et al. | 345/582 |
| 6,222,553 | B1 * | 4/2001 | DeRose et al. | 345/423 |
| 6,489,960 | B2 * | 12/2002 | DeRose et al. | 345/423 |
| 6,587,105 | B1 * | 7/2003 | Stam | 345/423 |
| 6,603,473 | B1 * | 8/2003 | Litke et al. | 345/423 |
| 6,738,062 | B1 * | 5/2004 | Moreton | 345/423 |
| 6,771,261 | B2 * | 8/2004 | MacPherson | 345/420 |
| 6,806,874 | B2 * | 10/2004 | Biermann et al. | 345/420 |
| 6,876,956 | B1 * | 4/2005 | Cirak et al. | 703/2 |
| 6,943,790 | B2 * | 9/2005 | Taubin | 345/420 |
| 7,023,435 | B1 * | 4/2006 | Litke et al. | 345/420 |

OTHER PUBLICATIONS

"Dynamic Catmull-Clark Subdivision Surface", Qin et al, IEEE Transactions of Visualization and Computer Graphics, vol. 4, No. 3, Jul. 1998.*
"Rapid Evaluation of Catmull-Clark Subdivision Surfaces", Bolz et al, Web3 '02, Feb. 2002.*
"Displaced Subdivision Surfaces", Lee et al, SIGGRAPH 2000, ACM 2000.*
"Exact Evaluation of Catmull-Clark Subdivision surfaces at Arbitrary Parameter Values", Stam, Alias Wavefront Inc. Apr. 1998.*
"Simple multiple B-spline surface fitting with Catmull-Clark subdivision surface for extraordinary corner patches", Ma et al, The Visual Computer, May 14, 2002.*
Towards Hardware Implementation of Loop-Subdivision, Bishoff et al, HWWS 2000, ACM 2000.*

* cited by examiner

*Primary Examiner*—Fred Ferris
(74) *Attorney, Agent, or Firm*—King & Schickli, PLLC

(57) ABSTRACT

A method for surface modeling of images to produce realistic images or to provide simulations with accurate surface information is provided. More particularly, the present invention relates to a new subdivision depth computation technique and to an improved label-driven adaptive subdivision technique for use in Catmull-Clark subdivision surface modeling systems. The method comprises computing a subdivision depth to determine the number of recursive subdivisions which may be performed on a control mesh to generate a plurality of finer mesh elements while preserving a predetermined error tolerance, and using the computed subdivision depth to construct an adaptively refined mesh that is substantially similar to the control mesh within the predetermined error tolerance. Limit control surfaces with and without extraordinary vertices may be analysed using the method of the invention. In another aspect, a software program for accomplishing the method of the present invention is provided.

25 Claims, 6 Drawing Sheets

(a)  (b)  (c)

(a)

(b)

(c)

(d)

SUBDIVISION SURFACE-BASED GEOMETRIC MODELING SYSTEM

This application claims the benefit of U.S. Provisional Patent Application Ser. No. 60/388,637 filed Jun. 14, 2002. This invention was made with Government support under NSF Grant No. DMI-9912069. The Government may have certain rights in this invention.

TECHNICAL FIELD

The present invention relates to the art of surface modeling of images to produce realistic images or to provide simulations with accurate surface information. More particularly, the present invention relates to a new subdivision depth computation technique and to an improved label-driven adaptive subdivision technique for use in Catmull-Clark subdivision surface modeling systems.

BACKGROUND OF THE INVENTION

Subdivision surfaces have become popular recently in graphical modeling, animation, and CAD/CAM because of their stability in numerical computation, simplicity in coding, and most importantly their capability in modeling/representing complex shape of arbitrary topology. Given a control mesh and a set of mesh refining rules, a user may obtain a limit surface by recursively cutting off corners of the control mesh. The limit surface is referred to as a subdivision surface because the corner cutting/mesh refining process is a generalization of the uniform B-spline surface subdivision technique. Subdivision surfaces include uniform B-spline surfaces and piecewise Bézier surfaces as special cases. It is also known in the art that subdivision surfaces may include non-uniform B-spline surfaces and NURBS surfaces as special cases. Subdivision surfaces can model/represent complex shape of arbitrary topology because there is no limit on the shape and topology of the control mesh of a subdivision surface. It is also known that subdivision surfaces cover both parametric forms and discrete forms. Since parametric forms are useful for design and representation and discrete forms are useful for machining and tessellation (including FE mesh generation), a representation is provided which is suitable for all graphics and CAD/CAM applications.

The prior art in subdivision surfaces has focused on the areas of surface trimming, boolean operations, and mesh editing. However, there are presently few suitable methods for dealing with precision/error control in subdivision surfaces, and in "smart" tessellation of subdivision surfaces. Given a predetermined error tolerance, it is necessary to determine how many levels of recursive Catmull-Clark subdivision should be performed on the initial control mesh such that the distance between the resultant control mesh and the limit surface is less than the predetermined error tolerance. It is also desirable to improve efficiency of tessellation based applications and data communication by generating a refined mesh within the required approximation precision of the limit surface with significantly fewer faces than the uniformly refined mesh. To date, efforts to reduce the number of faces in a mesh have focused on: (1) mesh simplification, i.e. removing over-sampled vertices and producing approximate meshes with various levels of detail; (2) approximating the limit surface by known surfaces, such as displaced subdivision surface or NURBS patches; and (3) application of adaptive refinement schemes to subdivision surfaces.

Accordingly, a need is identified for an improved method for subdivision surface modeling. The subdivision depth computation technique provided by the present invention provides precision/error control tools in subdivision surface trimming, finite element mesh generation, boolean operations, and surface tessellation for rendering processes. The label-driven adaptive subdivision technique of the invention improves efficiency of the above by generating an adaptively refined mesh that is within the required approximation precision of the limit surface, but with significantly fewer quadrilateral faces than prior art uniformly refined mesh techniques. The invention provides a subdivision depth computation technique for a Catmull-Clark subdivision surface (CCSS) patch, and provides also a label-driven adaptive subdivision technique for a CCSS based on subdivision depths calculated for its patches. A novel greedy algorithm is used to eliminate illegal vertex labels in the initial mesh.

Advantageously, the methods of the present invention provide a novel and efficient error control tool which is suitable for all tessellation-based applications of subdivision surfaces, and significantly reduce the number of faces in an adaptively refined quadrilateral mesh in a few subdivision steps, thereby improving efficiency of all tessellation-based applications and data communication of subdivision surfaces.

SUMMARY OF THE INVENTION

In accordance with a first aspect of the invention, a method for modeling or representing a surface or shape having an arbitrary topology which may be represented by a control mesh comprising at least one discrete Catmull-Clark Subdivision Surface (CCSS) patch defined by a set of control points is provided, comprising the steps of computing a subdivision depth determining the number of recursive subdivisions which may be performed on the control mesh to generate a plurality of finer mesh elements, whereby a distance between each finer mesh element and the corresponding limit surface patch is less than a predetermined error tolerance $\epsilon$. Next is the step of using the computed subdivision depth to construct an adaptively refined mesh that is substantially similar to the control mesh within the range of the predetermined error tolerance $\epsilon$. Each face of the recursively subdivided control mesh is a quadrilateral, and may contain up to one extraordinary vertex.

The method of the present invention is suitable for computing the subdivision depth, or the number of recursive subdivisions which may be performed on a surface patch while maintaining the predetermined error tolerance, for both surface patches which are not adjacent to an extraordinary vertex, and for surface patches which are adjacent to an extraordinary vertex.

For surface patches which are not adjacent to an extraordinary vertex, it will be appreciated that the surface patch will be a uniform bicubic B-spline surface patch which may be designated as S(u,v). In the absence of an extraordinary vertex, the next step is calculating a subdivision depth k defined as k levels of recursive subdivision performed on the control points of the surface patch S(u,v) to generate a level k control mesh, wherein k is defined as $k \geq \lceil \log_4 (M^0/3\epsilon) \rceil$, where $M^0$ is the second order norm of S(u,v) and the distance between S(u,v) and the level k control mesh is less than $\epsilon$.

If an extraordinary vertex is present in the patch being considered, the initial step is subdividing the surface patch at least twice to define at least one standard uniform bicubic B-spline surface subpatch and up to one extraordinary subpatch that is not a standard uniform bicubic B-spline subpatch, the extraordinary subpatch containing a limit point of up to one extraordinary vertex. Next, a subdivision depth $n_\epsilon$ for the extraordinary subpatch is computed, defined as n levels of recursive subdivision performed on the extraordinary subpatch to generate a level n extraordinary subpatch control mesh, wherein $n_\epsilon$ is defined as $$\eta_\epsilon \equiv \left\lceil \log_\delta\left(\frac{7G^0}{2\epsilon}\right) \right\rceil, \quad \delta = \begin{cases} \frac{4}{3}, & \text{if } N = 3 \\ \frac{98}{85}, & \text{if } N \geq 5 \end{cases}$$

where $G^0$ is the first order norm of $\Pi^0{}_0$, $\Pi^0{}_0$ is a level-0 control point defined as $\{V_i | 1 \leq i \leq 2N+8\}$, $V_i$ is an extraordinary vertex with valence N, and the distance between the level n extraordinary subpatch control mesh and a corresponding bilinear plane defined in the extraordinary subpatch is less than or equal to $\epsilon$ if $n \geq n_\epsilon$.

For the remaining patches not containing the extraordinary vertex (after the initial subdivision step described above), next is the step of computing a subdivision depth D by performing D recursive subdivisions on each standard uniform bicubic B-spline subpatch to define a level D control mesh, wherein D is defined as the maximum number of recursive subdivisions which may be performed such that the distance between the standard uniform bicubic B-spline subpatch and the level D control mesh is less than $\epsilon$.

In another aspect, the present invention provides a label-driven method of subdividing a Catmull-Clark subdivision surface patch derived as described above, comprising the steps of defining a mesh for which subdivision depths have been computed, the mesh comprising a plurality of quadrilateral faces containing up to one extraordinary vertex and having at least one interior face not adjacent a boundary of the control mesh and at least one exterior face adjacent a boundary of the control mesh, and defining an initial label of the interior face as a non-zero integer k wherein k is the subdivision depth of its corresponding surface patch with respect to $\epsilon$. The method also includes the step of defining an initial label of the exterior face as zero.

Next is the step of establishing a consistent condition for each face whereby no two adjacent vertices thereof have non-zero labels and no two adjacent vertices thereof have zero labels and further wherein the number of zero labels is maximized. The consistent condition is established by defining a connection supporting graph $G_b$ whose vertices are those of the faces having two adjacent vertices whose labels are zero, selecting a vertex from $G_b$, redefining the selected vertex label to 1, updating $G_b$, and repeating the process until the connection supporting graph contains no further vertices. For any face having two or more nonzero vertex labels, a balanced Catmull-Clark subdivision step is performed. For any face having only one vertex with zero label, an unbalance Catmull-Clark subdivision step is performed. Last is the step of computing new vertices from the results of the balanced and unbalanced Catmull-Clark subdivision steps to generate at least one new face defining the adaptively refined mesh structure.

In another aspect of the present invention, a computer software program for subdivision surface modeling is provided, wherein the software performs the steps as described above.

DETAILED DESCRIPTION OF THE INVENTION

Figure 1:
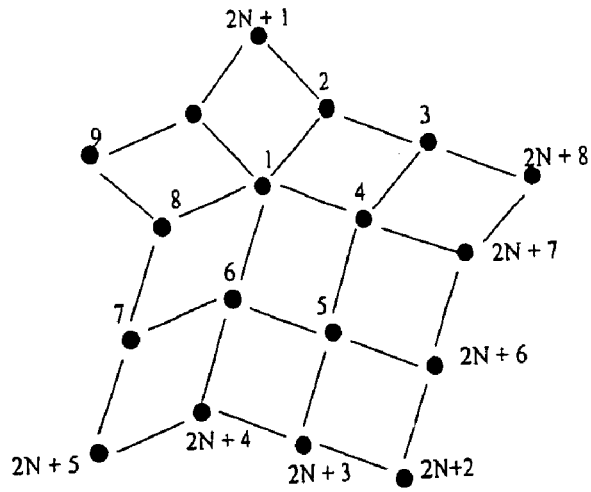
FIG. 1 schematically depicts the ordering of control points for a CCSS patch with an extraordinary vertex.

The present invention provides a method and computer program, which may conveniently be disposed on a computer readable medium, for calculating a subdivision depth for a Catmull-Clark subdivision surface (CCSS) patch, and provides also a label-driven adaptive subdivision technique for a CCSS based on subdivision depths calculated for its patches.

Subdivision Depth Computation for Patches not Near an Extraordinary Vertex.

The first step is computation of a subdivision depth for a desired surface. Let $V_0, V_1, V_2$, and $V_3$ be the control points of a uniform cubic B-spline curve segment C(t) whose parameter space is [0,1]. If the middle leg of the control polygon is parametrized as follows: $L(t) = V_1 + (V_2 - V_1)t$, $0 \leq t \leq 1$, then the maximum of $\|L(t) - C(t)\|$ is the distance between the curve segment and its control polygon. Thus:

$$\|L(t) - C(t)\| = \left\| \frac{(1-t)^3}{6}(2V_1 - V_0 - V_2) + \frac{t^3}{6}(2V_2 - V_1 - V_3) \right\| \leq \quad (1)$$

$$\frac{1}{6}\max\{\|2V_1 - V_0 - V_2\|, \|2V_2 - V_1 - V_3\|\}.$$

Since $(2V_1-V_0-V_2)/6$ and $(2V_2-V_1-V_3)/6$ are the values of $L(t)-C(t)$ at $t=0$ and $t=1$, the following lemma results:

Lemma 1: The maximum of $\|L(t)-C(t)\|$ occurs at the endpoints of the curve segment and may be expressed as $$\max_{0 \leq t \leq 1} \|L(t) - C(t)\| = \frac{1}{6} \max\{\|2V_1 - V_0 - V_2\|, \|2V_2 - V_1 - V_3\|\} \quad (2)$$

Next is the step of defining the distance between a uniform bicubic B-spline surface patch and its control mesh. Let $V_{i,j}$, $0 \leq i,j \leq 3$, be the control points of a uniform bicubic B-spline surface patch $S(u,v)$ with parameter space $[0,1] \times [0,1]$. If the central mesh face $\{V_{1,1}, V_{2,1}, V_{1,2}, V_{2,2}\}$ is parametrized as follows:

$$L(u,v)=(1-u)[(1-u)V_{1,1}+uV_{2,1}]+v[(1-u)V_{1,2}+uV_{2,2}],$$
$$0 \leq u,v \leq 1$$

then the maximum of $\|L(u,v)-S(u,v)\|$ is called the distance between $S(u,v)$ and its control mesh. Defining $Q_{u,k}$, $Q_{v,k}$, $\overline{Q}_{u,k}$, and $\overline{Q}_{v,k}$ as follows:

$$Q_{u,k} \equiv (1-u)V_{1,k} + uV_{2,k}, \quad Q_{v,k} \equiv (1-v)V_{k,1} + vV_{k,2},$$

$$\overline{Q}_{u,k} \equiv \sum_{i=0}^{3} N_{i,3}(u)V_{i,k}, \quad \overline{Q}_{v,k} \equiv \sum_{j=0}^{3} N_{j,3}(v)V_{k,j}$$

where $N_{i,3}(t)$ are standard uniform B-spline basis functions of degree 3 results in:

$$\|L(u,v) - S(u,v)\| < \quad (3)$$
$$(1-v)\|Q_{u,1} - \overline{Q}_{u,1}\| + v\|Q_{u,2} - \overline{Q}_{u,2}\| + \sum_{i=0}^{3} N_{i,3}(u)\|Q_{v,i} - \overline{Q}_{v,i}\|.$$

Application of Lemma 1 on $\|Q_{u,1}-\overline{Q}_{u,1}\|$, $\|Q_{u,2}-\overline{Q}_{u,2}\|$ and $\|Q_{v,i}-\overline{Q}_{v,i}\|$, $=1,2,3$, and by defining $M^0$ as the maximum norm of the second order forward differences of the control points of $S(u,v)$, we have $$\|L(u,v) - S(u,v)\| \leq \frac{1}{6}\left[(1-v)M^0 + vM^0 + \sum_{i=0}^{3} N_{i,3}(u)M^0\right] \leq \frac{1}{3}M^0.$$

$M^0$ is called the second order norm of $S(u,v)$. From this, the following lemma is derived:

Lemma 2: The maximum of $\|L(u,v)-S(u,v)\|$ satisfies the following inequality $$\max_{0 \leq u,v \leq 1} \|L(u,v) - S(u,v)\| \leq \frac{1}{3}M^0 \quad (4)$$

where $M^0$ is the second order norm of $S(u,v)$.

It should be noted that even though the maximum of $\|L(t)-C(t)\|$ occurs at the end points of the curve segment $C(t)$, the maximum of $\|L(u,v)-S(u,v)\|$ for a surface patch usually does not occur at the corners of $S(u,v)$. Based on the foregoing, the method for subdivision depth computation for surface patches not adjacent to an extraordinary vertex will now be presented.

Let $V_{i,j}$, $0 \leq i,j \leq 3$, be the control points of a uniform bicubic B-spline surface patch $S(u,v)$. We use $V^k_{i,j}$, $0 \leq i,j \leq 3+2^{k-1}$, to represent the new control points of the surface patch after k levels of recursive subdivision. The indexing of the new control points follows the convention that $V^k_{0,0}$ is always the face point of the mesh face $\{V^{k-1}_{0,0}, V^{k-1}_{1,0}, V^{k-1}_{0,1}, V^{k-1}_{1,1}\}$. The new control points $V^k_{i,j}$ will be called the level-k control points of $S(u,v)$ and the new control mesh will be called the level-k control mesh of $S(u,v)$.

Note that if the parameter space of the surface patch is divided into $4^k$ regions as follows:

$$\Omega^k_{m,n} = \left[\frac{m}{2^k}, \frac{m+1}{2^k}\right] \times \left[\frac{n}{2^k}, \frac{n+1}{2^k}\right], \quad (5)$$

where $0 \leq m,n \leq 2^k-1$ and let the corresponding subpatches be denoted $S^k_{m,n}(u,v)$, then each $S^k_{m,n}(u,v)$ is a uniform bicubic B-spline surface patch defined by the level-k control point set $\{V^k_{p,q} | m \leq p \leq m+3, n \leq q \leq n+3\}$. $S^k_{m,n}(u,v)$ is called a level-k subpatch of $S(u,v)$. One can define a level-k bilinear plane $L^k_{m,n}$ on $\{V^k_{p,q} | p=m+1, m+1; q=n+1, n+2\}$ and measure the distance between $L^k_{m,n}(u,v)$ and $S^k_{m,n}(u,v)$. It can be said that the distance between $S(u,v)$ and the level-k control mesh is smaller than $\epsilon$ if the distance between each level-k subpatch $S^k_{m,n}(u,v)$ and the corresponding level-k bilinear plane $L^k_{m,n}(u,v)$, $0 \leq m,n \leq 2^k-1$, is smaller than $\epsilon$. Next will be demonstrated how to calculate a subdivision depth k for a given $\epsilon$ so that the distance between $S(u,v)$ and the level-k control mesh is smaller than $\epsilon$ after k levels of recursive subdivision. The following lemma is needed in the derivation of the computation process. If we use $M^k_{m,n}$ to represent the second order norm of $S^k_{m,n}(u,v)$, i.e. the maximum norm of the second order forward differences of the control points of $S^k_{m,n}(u,v)$, then the lemma shows the second order norm of $S^k_{m,n}(u,v)$ converges at a rate of $1/4$ of the level-(k-1) second order norm. The proof of this lemma is provided in Appendix A.

Lemma 3: If $M^k_{m,n}$ is the second order norm of $S^k_{m,n}(u,v)$, then we have $$M^k_{m,n} \leq \left(\frac{1}{4}\right)^k M^0 \quad (6)$$

where $M^0$ is the second order norm of $S(u,v)$.

With lemmas 2 and 3, it is easy to see that, for any $0 \leq m,n \leq 2^{k-1}$, we have $$\max_{0 \leq u,v \leq 1} \|L^k_{m,n}(u,v) - S^k_{m,n}(u,v)\| \leq \frac{1}{3}M^k_{m,n} \leq \frac{1}{3}\left(\frac{1}{4}\right)^k M^0.$$

Hence, if k is large enough to make the right side of (7) smaller than $\epsilon$, we have $$\max_{0 \le u,v \le 1} \|L^k_{m,n}(u,v) - S^k_{m,n}(u,v)\| \le \epsilon$$

for every $0 \le m,n \le 2^{k-1}$. This leads to the following:

Theorem 4: Let $V_{i,j}$, $0 \le i,j \le 3$, be the control points of a uniform bicubic B-spline surface patch $S(u,v)$. For any given $\epsilon > 0$, if $$k \ge \left\lceil \log_4\left(\frac{M^0}{3\epsilon}\right) \right\rceil \tag{8}$$

levels of recursive subdivision are performed on the control points of $S(u,v)$, then the distance between $S(u,v)$ and the level-k control mesh is smaller than $\epsilon$ where $M^0$ is the second order norm of $S(u,v)$.

Subdivision Depth Computation for Patches Near an Extraordinary Vertex.

A different analysis is required for computation of subdivision depth for surface patches near extraordinary vertices, necessitated by the fact that one does not have a uniform B-spline surface patch representation and cannot use the analysis of Theorem 4 directly. The method of the present invention dictates making the size of such a vicinity as small as possible, thereby reducing such size to a degree that is tolerable (i.e., within the given error tolerance) and use the analysis of Theorem 4 to analyze the remaining portion of the surface patch. A subdivision depth computation based on this concept for a CCSS patch near an extraordinary vertex is presented below. It is assumed that the initial mesh has been subdivided at least twice such that each mesh face is a quadrilateral and contains at most one extraordinary vertex.

Let $\Pi^0_0 = \{V_i | 1 \le i \le 2N+8\}$ be a level-0 control point set that influences the shape of a surface patch $S(u,v)$ ($= S^0_0(u,v)$). $V_1$ is an extraordinary vertex with valence N. The control vertices are ordered following Stam's fashion (Stam, J. 1998. Exact Evaluation of Catmull-Clark Subdivision Surfaces at Arbitrary Parameter Values. In *Proceedings of SIGGRAPH* 1998, 395–404, incorporated herein by reference) as schematically depicted in FIG. 1.

Figure 2:
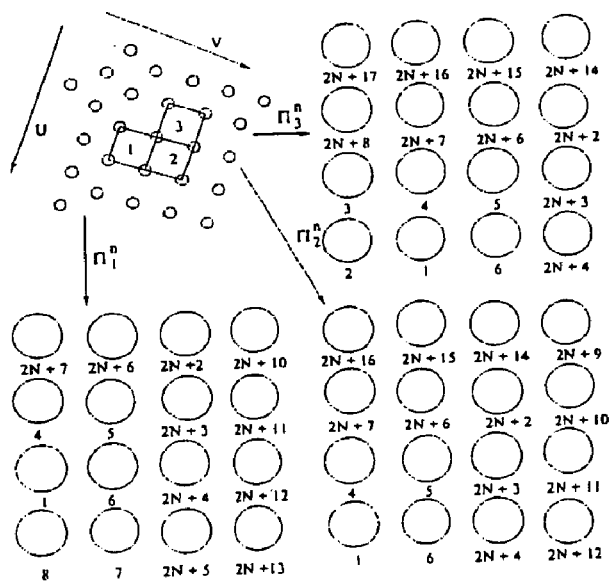
FIG. 2 schematically depicts a representative population of control point sets.

Using $V^n_i$ to represent the level-n control vertices generated after n levels of recursive Catmull-Clark subdivision, and use $S^n_0$, $S^n_1$, $S^n_2$ and $S^n_3$ to represent the subpatches of $S^{n-1}_0$ defined over the tiles $$\Omega^n_0 = \left[0, \frac{1}{2^n}\right] \times \left[0, \frac{1}{2^n}\right], \quad \Omega^n_1 = \left[\frac{1}{2^n}, \frac{1}{2^{n-1}}\right] \times \left[0, \frac{1}{2^n}\right],$$

$$\Omega^n_2 = \left[\frac{1}{2^n}, \frac{1}{2^{n-1}}\right] \times \left[\frac{1}{2^n}, \frac{1}{2^{n-1}}\right], \quad \Omega^n_3 = \left[0, \frac{1}{2^n}\right] \times \left[\frac{1}{2^n}, \frac{1}{2^{n-1}}\right],$$

respectively, then the shape of $S^n_0$, $S^n_1$, $S^n_2$ and $S^n_3$ are influenced by the level-n control point sets $\Pi^n_0$, $\Pi^n_1$, $\Pi^n_2$, and $\Pi^n_3$ are depicted in FIG. 2.

$$\Pi^n_0 = \{V^n_i | 1 \le i \le 2N+8\}$$

$S^n_1$, $S^n_2$ and $S^n_3$ are standard uniform bicubic B-spline surface patches because their control meshes satisfy a 4-by-4 structure. Hence, the technique described in Theorem 4 can be used to compute a subdivision depth for each of them. $S^n_0$ is not a standard uniform bicubic B-spline surface patch. Hence, Theorem 4 can not be used to compute a subdivision depth for $S^n_0$ directly. For convenience $S^n_0$ may be called a level-n extraordinary subpatch of $S(u,v)$ because it contains the limit point of the extraordinary points (see below). Note that if $H_0$ and $H_n$ are column vector representations of the control points of $\Pi^0_0$ and $\Pi^n_0$, respectively, $$H_0 \equiv (V_0, V_1, \ldots, V_{2N+8})^t, H_n \equiv (V^n_0, V^n_1, \ldots, V^n_{2N+8})^t$$

where $(X, X, \ldots, X)^t$ represents the transpose of the row vector $(X, X, \ldots, X)$ then we have $$H_n = (\bar{T})^n H_0 \tag{9}$$

where $\bar{T}$ is the $(2N+8) \times (2N+8)$ (extended) subdivision matrix defined as follows:

$$\bar{T} \equiv \begin{pmatrix} \overline{T} & 0 \\ \overline{T}_{1,1} & \overline{T}_{1,2} \end{pmatrix} \tag{10}$$

with $$\overline{T} = \begin{pmatrix} a_N & b_N & c_N & b_N & c_N & b_N & \cdots & b_N & c_N \\ d & d & e & e & 0 & 0 & \cdots & e & e \\ f & f & f & f & 0 & 0 & \cdots & 0 & 0 \\ d & e & e & d & e & e & \cdots & 0 & 0 \\ f & 0 & 0 & f & f & f & \cdots & 0 & 0 \\ \vdots & & & & & & \ddots & \vdots \\ d & e & 0 & 0 & 0 & 0 & \cdots & d & e \\ f & f & 0 & 0 & 0 & 0 & \cdots & f & f \end{pmatrix}, \tag{11}$$

$$\overline{T}_{1,1} = \begin{pmatrix} c & 0 & 0 & b & a & b & 0 & 0 & 0 \\ e & 0 & 0 & e & d & d & 0 & 0 & 0 \\ b & 0 & 0 & c & b & a & b & c & 0 \\ e & 0 & 0 & 0 & 0 & d & d & e & 0 \\ e & 0 & 0 & d & d & e & 0 & 0 & 0 \\ b & c & b & a & b & c & 0 & 0 & 0 \\ e & e & d & d & 0 & 0 & 0 & 0 & 0 \end{pmatrix}, \tag{12}$$

$$\overline{T}_{1,2} = \begin{pmatrix} c & b & c & 0 & b & c & 0 \\ 0 & e & e & 0 & 0 & 0 & 0 \\ 0 & c & b & c & 0 & 0 & 0 \\ 0 & 0 & e & e & 0 & 0 & 0 \\ 0 & 0 & 0 & 0 & e & e & 0 \\ 0 & 0 & 0 & 0 & c & b & c \\ 0 & 0 & 0 & 0 & 0 & e & e \end{pmatrix} \tag{13}$$

and $$a_N = 1 - \frac{7}{4N}, b_N = \frac{3}{2N^2}, c_N = \frac{1}{4N^2}, a = \frac{9}{16},$$

$$b = \frac{3}{32}, c = \frac{1}{64}, d = \frac{3}{8}, e = \frac{1}{16}, f = \frac{1}{4}.$$

Subdivision Depth Computation for a Vicinity of the Extraordinary Vertex.

The goal is to find an integer $n_\epsilon$ for a given $\epsilon > 0$ so that if $n \,(\geq n_\epsilon)$ recursive subdivisions are performed on $\Pi^0_0$, then the control set point of the level-n extraordinary subpatch $S^n_0$ of $S(u,v)$, $\Pi^n_0 = \{V^n_i | 1 \leq i \leq 2N+8\}$, is contained in the sphere $B(V^{n+1}_5, \epsilon/2)$ with center $V^{n+1}_5 \equiv (V^n_1 + V^n_4 + V^n_5 + V^n_6)/4$ and radius $\epsilon/2$. Note that if the $(2N+8)$-point control mesh is contained in the then the level-n extraordinary subpatch $S^n_0$ is contained in the sphere $B(V^{n+1}_5, \epsilon/2)$ as well. This follows from the fact that $S^n_0$, as the limit surface of $\Pi^n_0$, is contained in the convex hull of $\Pi^n_0$ and the convex hull of $\Pi^n_0$ is contained in the sphere $B(V^{n+1}_5, \epsilon/2)$. Then, we have $$\max \|S_0^n(u,v) - L_0^n(u,v)\| < \epsilon \tag{14}$$

where $L^n_0(u,v)$ is a bilinear plane defined on the level-n mesh face $\{V^n_1 + V^n_4 + V^n_5 + V^n_6\}$. The construction of such an $n_\epsilon$ depends on several properties of the (extended) subdivision matrix T and the control point sets $\{\Pi^n_0\}$.

First note that since all the entries of the extended subdivision matrix T are non-negative and the sum of each row equals one, the extended subdivision matrix is a transition probability matrix of a $(2N+8)$-state Markov chain. In particular, the $(2N+1) \times (2N+1)$ block $T^*$ of T is a transition probability matrix of a $(2N+1)$-state Markov chain. The entries in the first row and first column of $T^*$ are all non-zero. Therefore, the matrix $T^*$ is irreducible because $(T^*)^2$ has no zero entries and, consequently, all the states are accessible to each other. On the other hand, since all the diagonal entries of $T^*$ are non-zero and entries of $(T^*)^n$ are non-zero for all $n \geq 2$, it follows that all the states of $T^*$ are aperiodic and positive recurrent. Consequently, the Markov chain is irreducible and ergodic. By the well-known theorem of Markov chain, Theorem 4), $(T^*)^n$ converges to a limit matrix $\overline{T}^*$ whose rows are identical. More precisely $$\lim_{n \to \infty} (\overline{T})^n = \overline{T}^* \equiv \begin{pmatrix} \Delta_1 & \Delta_2 & \cdots & \Delta_{2N+1} \\ \Delta_1 & \Delta_2 & \cdots & \Delta_{2N+1} \\ \vdots & \vdots & \ddots & \vdots \\ \Delta_1 & \Delta_2 & \cdots & \Delta_{2N+1} \end{pmatrix} \tag{15}$$

where $\Delta_i$ are the unique non-negative solution of $$\Delta_j = \sum_{i=1}^{2N+1} \Delta_i \bar{t}_{i,j}, \quad j = 1, 2, \cdots, 2N+1 \tag{16}$$

$$\sum_{j=1}^{2N+1} \Delta_j = 1$$

with $\bar{t}_{i,j}$ being the entries of $\overline{T}^*$. One can easily get the following observations.

The vector $(\Delta_1, \Delta_2, \ldots, \Delta_{2N+1})$ satisfies the following properties:

$$\Delta_1 = \frac{N}{N+5}$$

$$\Delta_2 = \Delta_4 = \cdots = \Delta_{2N} = \frac{4}{N(N+5)}$$

-continued $$\Delta_3 = \Delta_5 = \cdots = \Delta_{2N+1} = \frac{1}{N(N+5)}$$

The matrix $\overline{T}^*$ is an idempotent matrix, i.e. $\overline{T}^* \cdot \overline{T}^* = \overline{T}^*$. Hence, $\overline{T}^*$ has two eigenvalues, 1 and 0 (with multiplicity 2N).

$T^*$ has 1 as an eigenvalue and all the other 2N eigenvalues of $T^*$ have a magnitude smaller than one.

As is well known, the limit point of $\{V^n_1\}$ is $$V^*_1 = \Delta_1 V_1 + \Delta_2 V_2 + \cdots \Delta_{2N+1} V_{2N+1}.$$

But $V^*_1$ is actually the limit point of all $V^n_j$, $j=1, 2, \ldots, 2N+8$. Therefore, the convex hull of $\{V^n_1, V^n_2, \ldots, V^n_{2N+8}\}$ converges to $V^*_1$ when n tends to infinity and, consequently, $V^*_1 = S(0,0)$. The fact that $V^*_1$ is the limit point of $\{V^n_1, V^n_2, \ldots, V^n_{2N+1}\}$ follows from (9) and (15). The fact that $V^*_1$ is also the limit point of $\{V^n_{2N+2}, V^n_{2N+3}, \ldots, V^n_{2N+8}\}$ is demonstrated in Appendix B.

The last observation is important because it shows that $$\max_{V \in \Pi^n_0} \|V^{n+1}_5 - V\| \tag{17}$$

converges. Therefore, it is possible to reduce the size of $S^n_0$ to a degree that is tolerable if n is large enough. For a given $\epsilon > 0$ we will find an $n_\epsilon$ so that if $n \geq n_\epsilon$ then the level-n control point set $\Pi^n_0$ is contained in the sphere $B(V^{n+1}_5, \epsilon/2)$. To do this, we need to know how fast (17) converges.

Figure 3:
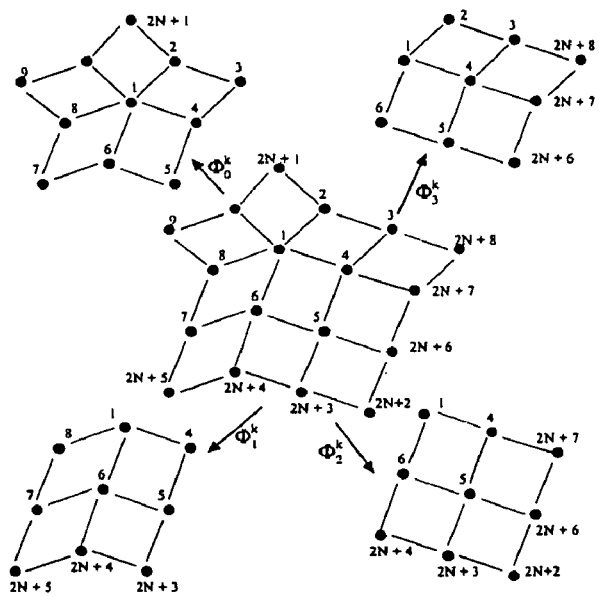
FIG. 3 schematically depicts the subdivision of a surface patch having an extraordinary vertex into a plurality of standard uniform bicubic B-spline surface subpatches and a single extraordinary subpatch that is not a standard uniform bicubic B-spline subpatch which contains the limit point of the extraordinary vertex.

Referring to FIG. 3, let $\Phi^k_0, \Phi^k_1, \Phi^k_2$, and $\Phi^k_3$, be subsets of $\Pi^k_0$ defined as follows:

$$\Phi_0^k = \{V_j^k | j=1,2,\ldots,2N+1\},$$

$$\Phi_1^k = \{V_j^k | j=1,4,5,\ldots,8,2N+3,2N+4,2N+5\},$$

$$\Phi_2^k = \{V_j^k | j=1,4,5,6,2N+2,2N+3,2N+4,2N+6,2N+7\},$$

$$\Phi_3^k = \{V_j^k | j=1,2,\ldots,6,2N+6,2N+7,2N+8\} \tag{18}$$

($V^k_8$ in $\Phi^k_1$ should be replaced with $V^k_2$ if N=3) and define $G^k_0, G^k_1, G^k_2$, and $G^k_3$ as follows:

$$G_0^k = \max_{V \in \Phi_0^k} \|V_1^k - V\|, \; G_1^k = \max_{V \in \Phi_1^k} \|V_6^k - V\|,$$
$$G_2^k = \max_{V \in \Phi_2^k} \|V_5^k - V\|, \; G_3^k = \max_{V \in \Phi_3^k} \|V_4^k - V\|. \tag{19}$$

$G^k_i$ is called the first order norm of $\Phi^k_i$, i=0, 1, 2, 3. We need the following lemma for the construction of $n_\epsilon$. The proof is shown in Appendix C.

Lemma 5: If $\Phi^k_i$ and $G^k_i$ are defined as above, then for i=0, 1, 2, 3, we have $$G_i^k \leq \begin{cases} \left(\frac{3}{4}\right)^k G^0, & \text{if } N = 3 \\ \left(\frac{3}{4} + \frac{7}{4N} - \frac{13}{2N^2}\right)^k G^0, & \text{if } N \geq 5 \end{cases} \tag{20}$$

where $G^0 \equiv \max \{G^0_0, G^0_1, G^0_2, G^0_3\}$. $G^0$ is called the first order norm of $\Pi^0_0$.

To construct $n_\epsilon$, note that if $V \in \Pi^n_0$ and $V \in \Phi^n_0$, we have $$\|V_5^{n+1} - V\| \leq \frac{1}{4}\|V_4^n - V_1^n\| + \frac{1}{4}\|V_5^n - V_1^n\| + \frac{1}{4}\|V_6^n - V_1^n\| + \|V_1^n - V\| \leq \frac{7}{4}G_0^n.$$

It is easy to prove that similar inequalities hold for $\Phi''_1, \Phi''_2$, and $\Phi''_3$ as well. Hence, for each $V \in \Pi^0_0$, by Lemma 5 we have $$\|V_5^{n+1} - V\| \leq \begin{cases} \frac{7}{4}\left(\frac{3}{4}\right)^n G^0, & \text{if } N = 3 \\ \frac{7}{4}\left(\frac{3}{4} + \frac{7}{4N} - \frac{13}{2N^2}\right)^n G^0, & \text{if } N \geq 5 \end{cases} \quad (21)$$

Since the maximum of $3/4 + 7/4N - 13/2N^2$ occurs at N=7, (21) can be simplified as $$\|V_5^{n+1} - V\| \leq \frac{7}{4}\left(\frac{1}{\delta}\right)^n G^0 \quad (22)$$

where $$\delta = \begin{cases} \frac{4}{3}, & \text{if } N = 3 \\ \frac{98}{85}, & \text{if } N \geq 5 \end{cases} \quad (23)$$

Hence, $\|V^{n+1}_5 - V\|$ is smaller than $\epsilon/2$ if n is large enough to make the right hand side of (22) smaller than or equal to $\epsilon/2$. Consequently, we have the following theorem.

Theorem 6: Let $\Pi^0_0 = \{V_i | 1 \leq i \leq 2N+8\}$ be a level-0 control point set that influences the shape of a CCSS patch $S(u,v)$ ($=S^0_0(u,v)$). $V_1$ is an extraordinary vertex with valence N. The control vertices are ordered following Stam's fashion. For a given $\epsilon > 0$, if $n_\epsilon$ is defined as follows:

$$n_\epsilon \equiv \left\lceil \log_\delta\left(\frac{7G^0}{2\epsilon}\right) \right\rceil, \quad \delta = \begin{cases} \frac{4}{3}, & \text{if } N = 3 \\ \frac{98}{85}, & \text{if } N \geq 5 \end{cases} \quad (24)$$

where $G^0$ is the first order norm of $\Pi^0_0$, then the distance between the level-n extraordinary subpatch $S''_0(u,v)$ and the corresponding bilinear plane $L''_0(u,v)$ is smaller than or equal to $\epsilon$ if $n \geq n_\epsilon$. Theorem 6 shows that the rate of convergence of the control mesh in the vicinity of an extraordinary vertex is fastest when valence of the extraordinary vertex is three.

Subdivision Depth Computation for the Remaining Part.

It is desired, for each k between 1 and $n_\epsilon$, to determine a subdivision depth $D_k (\geq n_\epsilon)$ so that if $D_k$ recursive subdivisions are performed on the control mesh $\Pi^0_0$ of $S(u,v)$, then the distance between the level-$D_k$ control mesh and the subpatches $S^k_i$, $i=1, 2, 3$, is smaller than $\epsilon$. Consequently, if we define D to be the maximum of these $D_k$ (i.e. D=max $\{D_k | 1 \leq k \leq n_\epsilon\}$), then after D recursive subdivisions, the distance between the level-D control mesh and the subpatches $S^k_i$, $i=1, 2, 3$, would be smaller than $\epsilon$ for all $1 \leq k \leq n_\epsilon$. Note that the distance between the level-D control mesh and the subpatches $S^k_1$, $S^k_2$, and $S^k_3$ for $n_\epsilon + 1 \leq k \leq D$, and the distance between the level-D control mesh and the level-D extraordinary subpatch $S^D_0$ would be smaller than $\epsilon$ as well. This is because these subpatches are subpatches of $S^{n_\epsilon}_0$ and the distance between $S^{n_\epsilon}_0$ and the level-$n_\epsilon$ control mesh is already smaller than $\epsilon$. Hence, the key here is the construction of $D_k$. We will show the construction of $D_k$ for $S^k_3(u,v)$. This $D_k$ works for $S^k_1(u,v)$ and $S^k_2(u,v)$ as well.

For $0 \leq u, v \leq 1$, define a bilinear plane $L^k_3(u, v)$ on the mesh face $\{V^k_4, V^k_5, V^k_{2N+7}, V^k_{2N+6}\}$ as follows:

$$L^k_3(u,v) = (1-v)[(1-u)V^k_4 + uV^k_4] + v[(1-u)V^k_{2N+7} + uV^k_{2N+6}]. \quad (25)$$

Since $S^k_3(u, v)$ is a uniform bicubic B-spline surface patch with control mesh $\Pi^k_3$, we have, by Lemma 2, $$\|L^k_3(u,v) - S^k_3(u,v)\| \leq 1/3 Z^k_3 \quad (26)$$

where $Z^k_3$ is the second order norm of $S^k_3(u,v)$. If we define $Z^i_0$ to be the second order norm of $S^i_0(u,v)$, we have $$Z^k_3 \leq W Z^{k-1}_0 \leq (W)^k Z^0_0 \quad (27)$$

where $$W = \begin{cases} \frac{2}{3}, & \text{if } N = 3 \\ \frac{1}{2} + \frac{1}{4N} + \frac{21}{4N^2}, & \text{if } N = 5 \\ \frac{3}{4} + \frac{2}{N} - \frac{21}{2N^2}, & \text{if } N > 5 \end{cases} \quad (28)$$

The proof of (27) is shown in Appendix D. Hence, by combining the above results, we have Lemma 7 The maximum distance between $S^k_3$ and $L^k_3$ satisfies the following inequality $$\max\|L^k_3(u,v) - S^k_3(u,v)\| \leq 1/3 (W)^k Z^0_0 \quad (29)$$

where W is defined in (28) and $Z^0_0$ is the second order norm of $S(u,v)$.

It should be pointed out that when defining $Z^i_0$, only the following items are needed for second order forward differences involving $V^i_1$:

$$\|2V^i_1 - V^i_{2j} - V^i_{2[(j+2)\%N]}\|, j=1,2,\ldots,N.$$

Lemma 7 shows that if $1/3(W)^k Z^0_0 \leq \epsilon$ then the distance between $S^k_3$ and $L^k_3$ is already smaller than $\epsilon$. However, since $n_\epsilon$ subdivisions have to be performed on $\Pi^0_0$ to get $S^{n_\epsilon}_0$ anyway, $D_k$ for $S^k_3$ in this case is set to $n_\epsilon$. This condition holds for $S^k_1$ and $S^k_2$ as well.

If $1/3(W)^k Z^0_0 > \epsilon$, further subdivisions are needed on $\Pi^k_i$, $i=1, 2, 3$, to make the distance between $S^k_i$, $i=1, 2, 3$, and the corresponding mesh faces smaller than $\epsilon$. Considering $S^k_3$ again, $S^k_3$ is a uniform bicubic B-spline surface patch with control mesh $\Pi^k_3$. Therefore, if $l_k$ recursive subdivisions are performed on the control mesh $\Pi^k_3$, by Lemma 2 and Lemma 3 we would have $$\|L^{l_k}_3(u,v) - S^k_3(u,v)\| \leq 1/3 (1/4)^{l_k} Z^k_3 \quad (30)$$

where $L^{l_k}_3(u,v)$ is a level-$l_k$ control mesh relative to $\Pi^k_3$ and $Z^k_3$ is the second order norm of $S^k_3(u, v)$. Therefore, by combining the above result with 27), we have $$\|L^{l_k}_3(u,v) - S^k_3(u,v)\| \leq 1/3 (1/4)^{l_k} (W)^k Z^0_0 \quad (31)$$

We get the following Lemma by setting the right hand side of (31) smaller than or equal to $\epsilon$.

Lemma 8 In Lemma 7, if the distance between $S^k_3$ and $L^k_3$ is not smaller than $\epsilon$, then one needs to perform $l_k$ $$l_k = \left\lceil \log_4\left(\frac{(W)^k Z^0_0}{3\epsilon}\right) \right\rceil \quad (32)$$

more recursive subdivisions on the level-k control mesh $\Pi^k_3$ of $S^k_3$ to make the distance between $S^k_3$ and the level-$(k+l_k)$ control mesh smaller than $\epsilon$.

This result works for for $S^k_1$ and $S^k_2$ as well. Note that the value of $(W)^k Z^0_0$ is already computed in Lemma 7 and W hs to be computed only once. Therefore, the subdivision depth $D_k$ for $S^k_1$, $S^k_2$, and $S^k_3$ is defined as follows:

$$D_k = \max\left\{n_\epsilon, k + \left\lceil \log_4\left(\frac{(W)^k Z^0_0}{3\epsilon}\right) \right\rceil\right\} \quad (33)$$

Consequently, we have the following main theorem:

Theorem 9 Let $\Pi^0_0 = \{V_i | 1 \leq i \leq 2N+8\}$ be the control mesh of a CCSS patch $S(u,v)$. The control points are ordered following Stam's fashion with $V_1$ being an extraordinary vertex of valence N (see FIG. 1). For a given $\epsilon > 0$, if we compute $n_\epsilon$ as in (24) and D as follows:

$$D = \max\{D_k | 1 \leq k \leq n_\epsilon\} \quad (34)$$

where $D_k$ is defined in (33) then after D recursive subdivisions, the distance between $S(u,v)$ and the level-D control mesh is smaller than $\epsilon$.

Label-Driven Adaptive Subdivision

Given a control mesh of arbitrary topology and an error tolerance $\epsilon > 0$, the next step is to construct an adaptively refined mesh that is close to within $\epsilon$ to the CCSS of the given control mesh, but with significantly fewer faces than are derived from the traditional Catmull-Clark subdivision process. The mesh refining process is driven by labels of mesh vertices.

The given control mesh will be referred to as $\Sigma^0$ with the assumption that all the faces are quadrilaterals and each face contains at most one extraordinary vertex (as described supra). The limit surface of $\Sigma^0$ will be referred to as F. For each positive integer k, $\Sigma^k$ refers to the result of applying k levels of recursive Catmull-Clark subdivision on $\Sigma^0$. A face of $\Sigma^k$ is called an interior face if it is not adjacent to the boundary of the mesh. Otherwise, it is called an exterior face. All the faces of a closed control mesh are interior faces. Each interior face f of $\Sigma^k$ has a corresponding surface patch in F, denoted $S_f$. The interior faces and their corresponding surface patches are parametrized using the techniques presented by Stam. The distance between f and the limit surface F is defined as the distance between f and the corresponding surface patch $S_f$.

The initial label of an interior face f in $\Sigma^0$, denoted $L_f(f)$, is set to k if k is the subdivision depth of the corresponding surface patch $S_f$ with respect to $\epsilon$. The label of an exterior face is set to zero. The label of a vertex V in $\Sigma^0$ is defined as the maximum of labels of adjacent faces, i.e., $$L_v(V) = \max\{L_f(f) | f \in \Sigma^0 \text{ and } V \text{ is a vertex of } f\}. \quad (35)$$

The adaptive refinement procedure requires vertex labels of $\Sigma^0$ to satisfy the consistent condition (Cheng, F. et al., 1989. A Parallel Mesh Generation Algorithm Based on the Vertex Label Assignment Scheme. *International Journal for Numerical Methods in Engineering* 28, 1429–1448, incorporated herein by reference). A face of $\Sigma^0$ is said to be an illegal face if two adjacent vertices have non-zero labels and two adjacent vertices have zero labels. The vertex labels of $\Sigma^0$ are said to satisfy the consistent condition if $\Sigma^0$ contains no illegal faces. The consistent condition ensures that the adaptively refined meshes are crack-free. Usually, $\Sigma^0$ does not satisfy the consistent condition. The easiest way to make $\Sigma^0$ satisfy the consistent condition is to set all the zero labels to 1. However, this would unnecessarily increase the number of faces generated in the resulting meshes since the number of faces in the refined meshes is determined by the labels of the vertices. A better way is to construct an extension function $E_v(V)$ of $L_v(V)$, $$E_v(V) = \begin{cases} L_v(V), & \text{if } L_v(V) > 0; \\ 0 \text{ or } 1, & \text{if } L_v(V) = 0, \end{cases} \quad (36)$$

which satisfies the consistent condition but with as many zero labels as possible.

A greedy algorithm for the construction of $E_v(V)$ via a connection supporting graph $G_b$ is therefore presented herein. The vertices of $G_b$ are those of the illegal faces whose labels are zero. The edges of $G_b$ are those of $\Sigma^0$ that connect vertices of $G_b$. The extension function $E_v(V)$ is constructed by repeatedly selecting a vertex from $G_b$, changing its label to 1 and then updating $G_b$ accordingly. This process continues until $G_b$ is empty. The complexity of this process is that changing the label of a vertex from 0 to 1 changes the status of adjacent faces: an illegal face might become legal and a legal face might become illegal. Therefore, after changing the label of a selected vertex from 0 to 1, one needs to remove some old vertices and edges from $G_b$ while adding some new vertices and edges into $G_b$. Obviously, the greedy algorithm should remove as many old vertices from $G_b$ and add as few new vertices into $G_b$ as possible during each selection and changing cycle. This is achieved by using the following rule in selecting a vertex from $G_b$ to change label. Let D(V) denote the degree of V in $G_b$ and let N(V) be the number of new vertices introduced into $G_b$ if the label of V is changed from 0 to 1. If the number of D(V)=1 vertices is not zero then, in the pool of vertices which are adjacent to a D(V)=1 vertex, select any one with a minimum N(V) among those with a maximum D(V). Otherwise, select any vertex with a minimum N(V) among the vertices of $G_b$ with a maximum D(V).

The adaptive subdivision process is driven by vertex labels and is performed on individual mesh faces independently. After each subdivision step, labels are assigned to the newly generated vertices so they can drive the next subdivision step. The resulting meshes are crack free. The assumption is made that labels of the vertices of $\Sigma^0$ are defined by an extension function $E_v$ even though the extension function might be the same as the original label function $L_v$. In the following, $\Sigma^k$, k=1, 2, . . . , stand for the meshes generated by the adaptive refinement process. Also, variables without a bar refer to elements in $\Sigma^{k-1}$, and variables with a bar refer to elements in $\Sigma^k$.

Figure 4:
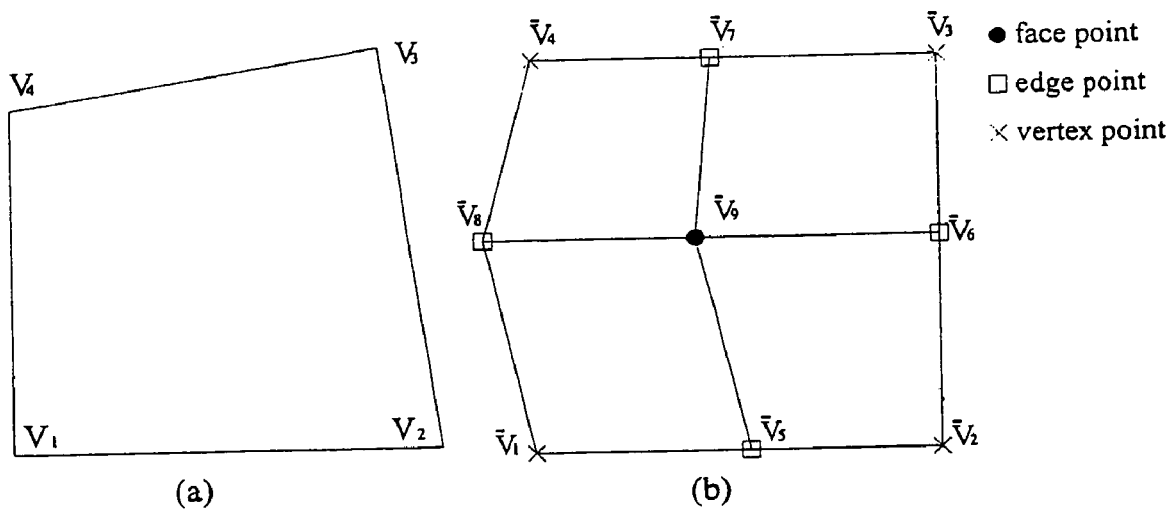
FIG. 4 schematically depicts FIG. 4 (a–b) schematically depicts the balanced Catmull-Clark subdivision of one of the standard uniform bicubic B-spline surface subpatches of FIG. 3.

The adaptive subdivision of $\Sigma^{k-1}$, $k \geq 1$, is performed as follows. If a face has two or more nonzero vertex labels, a balanced Catmull-Clark subdivision is performed on that face (see FIG. 4). A balanced Catmull-Clark subdivision is a standard Catmull-Clark subdivision. However, coordinates of the new vertices are not yet computed. The new vertices are marked for updating. Labels of the new vertices are defined as follows. For each new vertex point, $\overline{E}_v(\overline{V}_i)$=max $\{0, E_v(V_i)-1\}$, i=1, 2, 3, 4. For each new edge point, $\overline{E}_v(\overline{V}_i)$ is the minimum of labels of the new vertex points adjacent to $\overline{V}_i$, i=5, 6, 7, 8. For the new face point, $$\overline{E}_v(\overline{V})_9 = \begin{cases} 0, & \text{if } \overline{E}_v(\overline{V})_5 = \overline{E}_v(\overline{V})_6 = \overline{E}_v(\overline{V})_7 = \overline{E}_v(\overline{V})_8 = 0; \\ 1, & \text{if some but not all of } \{\overline{E}_v(\overline{V}_5), \overline{E}_v(\overline{V}_6), \overline{E}_v(\overline{V}_7), \overline{E}_v(\overline{V}_8)\} \text{ are zero;} \\ \min\{\overline{E}_v(\overline{V}) \mid \overline{V} \in \{\overline{V}_5, \overline{V}_6, \overline{V}_7, \overline{V}_8\}\}, & \text{otherwise.} \end{cases}$$

Figure 5:
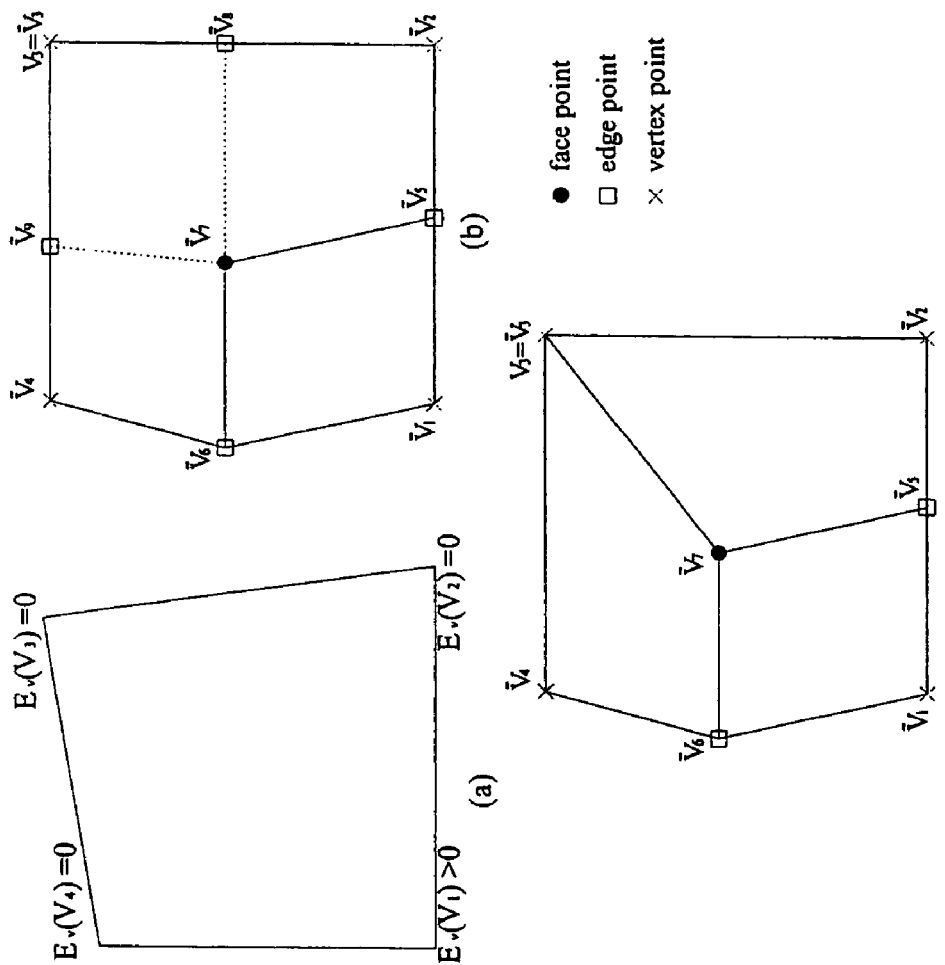
FIG. 5 schematically depicts FIG. 5 (a–c) schematically depicts the unbalanced Catmull-Clark subdivision of the extraordinary subpatch of FIG. 3.

If a face has only one vertex with nonzero label, an unbalanced Catmull-Clark subdivision with respect to that vertex is performed (see FIG. 5). An unbalanced Catmull-Clark subdivision generates three new faces only, as shown in FIG. 5*c*. However, $\overline{V}_8$, $\overline{V}_9$ and the auxiliary structure shown in FIG. 5*b* are computed and recorded for use in the computation of the vertices of $\Sigma^{k+1}$. Again, coordinates of the new vertices are not computed until a later point. The vertices, except $\overline{V}_3$, are marked for updating and later evaluation. The labels of the new points are set to zero except $\overline{V}_1$ which is defined as $\overline{E}_v(\overline{V}_1)=E_v(V_1)-1$. The faces without non-zero vertex labels are not further adaptively subdivided, but are inherited topologically.

After all the faces of $\Sigma^{k-1}$ are processed, vertices marked for updating in $\Sigma^k$ are computed using the Catmull-Clark subdivision scheme to find their coordinates in $\Sigma^k$. Note that the vertices of $\Sigma^{k-1}$ required in the computation process for the new vertices are available because they were stored with the auxiliary structure (see FIG. 5*b*) even though not output. Other vertices (vertices marked for updating) of $\Sigma^k$ are inherited from $\Sigma^{k-1}$ directly. Keeping an "update" status for some of the vertices in the adaptive subdivision process is necessary because whether a vertex should be inherited or updated depends on its adjacent faces. The adaptive refinement process stops when labels of all the new vertices are zero.

Other aspects of the present invention will become apparent to those skilled in this art from the following description wherein there is shown and described a preferred embodiment of this invention, simply by way of illustration of one of the modes best suited to carry out the invention. As it will be realized, this invention is capable of other different embodiments and its several details are capable of modification in various, obvious aspects all without departing from the intended scope of the invention. Accordingly, the descriptions and examples herein will be regarded as illustrative in nature and not as restrictive.

EXAMPLE 1

Figure 6:
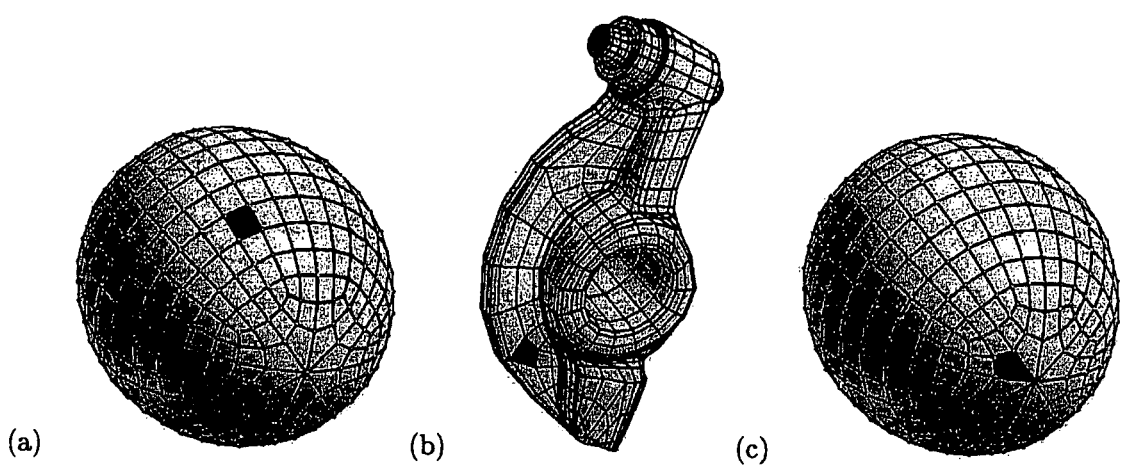
FIG. 6 (a–c) depicts the distance and subdivision depth computation for a CCSS patch having: (a) no extraordinary vertex; (b) an extraordinary vertex of valence 5; and (c) an extraordinary vertex of valence 8.

Referring to FIG. 6, distance and subdivision depth computation for a CCSS patch was calculated for several surfaces. The distances between the faces of the control meshes and the corresponding limit surface patches for each mesh face were 0.034 (FIG. 6*a*), 0.25 (FIG. 6*b*), and 0.15 (FIG. 6*c*). For an error tolerance of 0.01, the subdivision depths computed for each mesh face was 1 (FIG. 6*a*), 24 (FIG. 6*b*), and 22 (FIG. 6*c*). The calculated subdivision depths for the mesh faces shown in FIGS. 6*b* and 6*c* were greater because each surface has an extraordinary vertex. For the mesh face shown in FIG. 6*b*, subdivision depths for error tolerances 0.25, 0.2, 0.1, 0.01, 0.001, and 0.0001 were 1, 3, 9, 24, 40, and 56, respectively.

EXAMPLE 2

Figure 7:
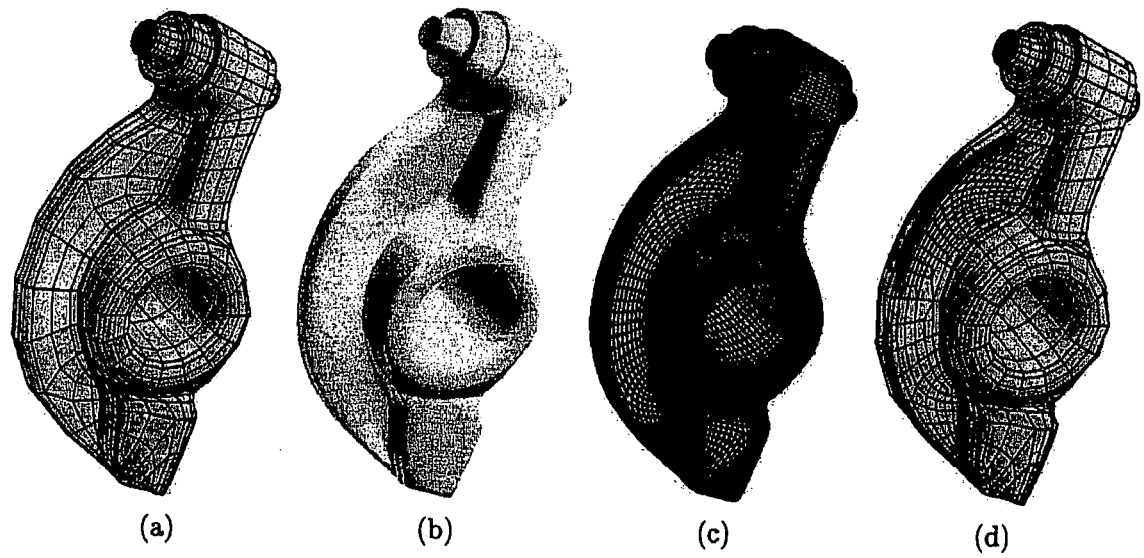
FIG. 7 graphically depicts a rocker FIG. 7 (a–d) graphically depicts a rocker arm, showing: (a) a control mesh therefor; (b) a limit surface therefor; (c) the result of performing a conventional uniform subdivision process; and (d) the result of performing the adaptive subdivision method of the present invention.
Figure 8:
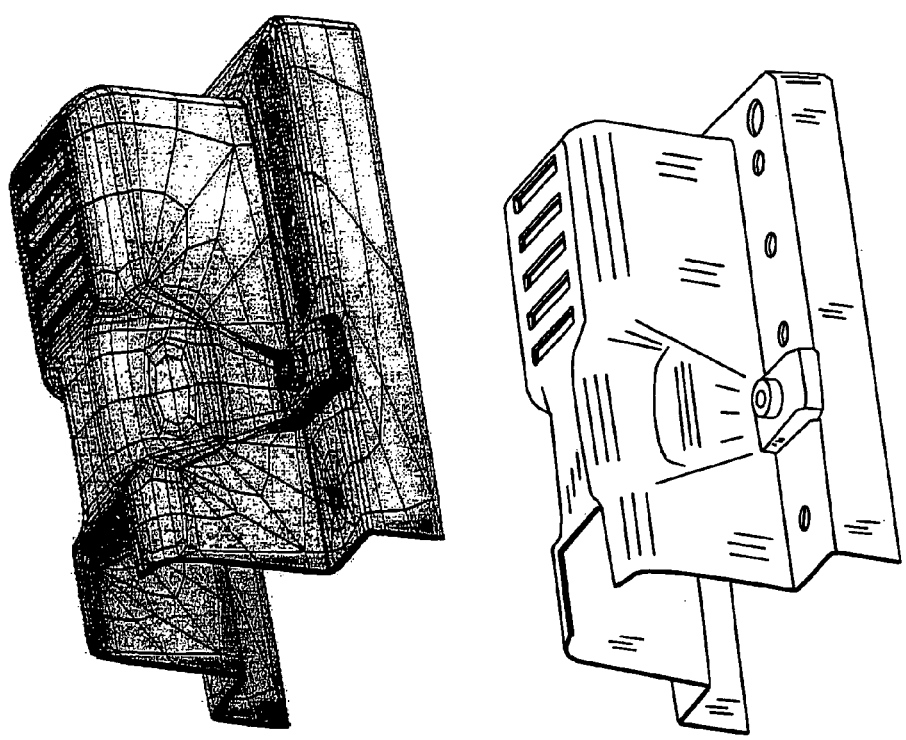
FIG. 8 (a–d) depicts the distance a ventilation controller component, showing: (a) a control mesh therefor; (b) a limit surface therefor; (c) the result of performing a conventional uniform subdivision process; and (d) the result of performing the adaptive subdivision method of the present invention.
Figure 8:
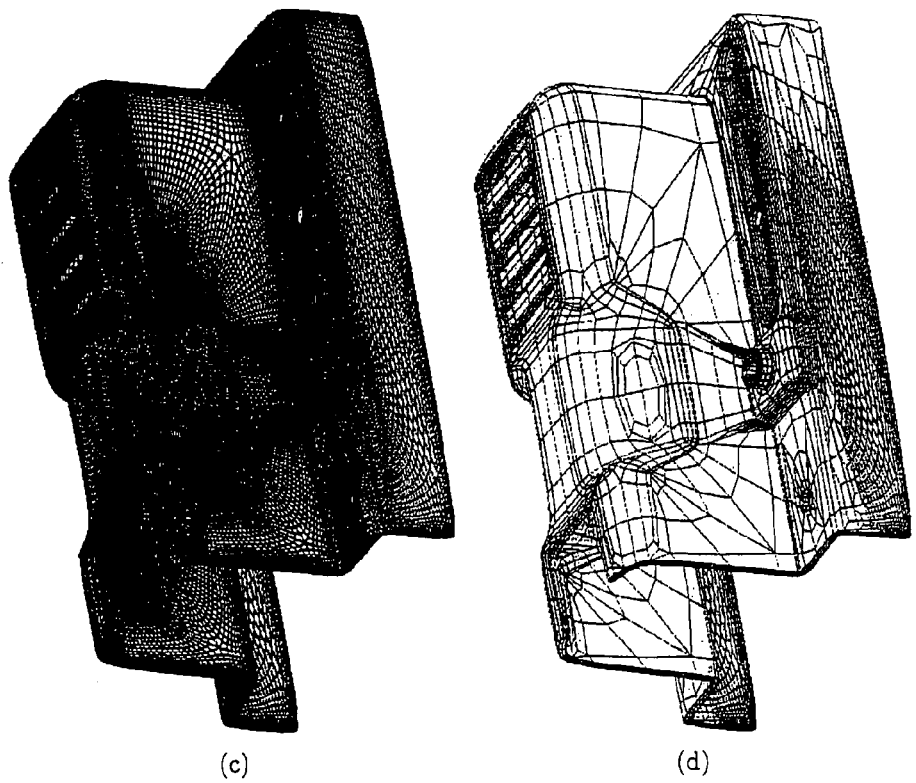
Figure 9:
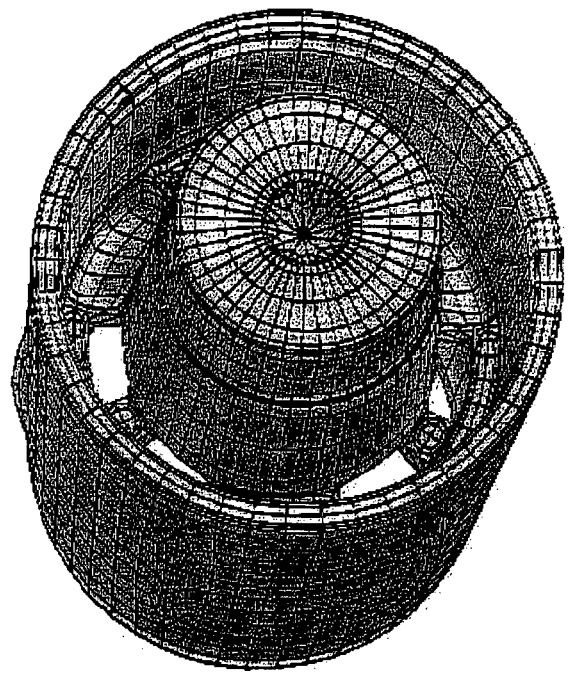
FIG. 9 (a–d) graphically depicts a marker cap, showing: (a) a control mesh therefor; (b) a limit surface therefor; (c) the result of performing a conventional uniform subdivision process; and (d) the result of performing the adaptive subdivision method of the present invention.
Figure 9:
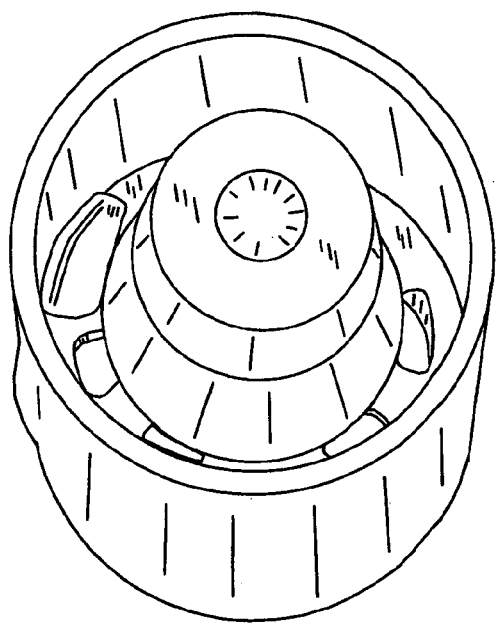
Figure 9:
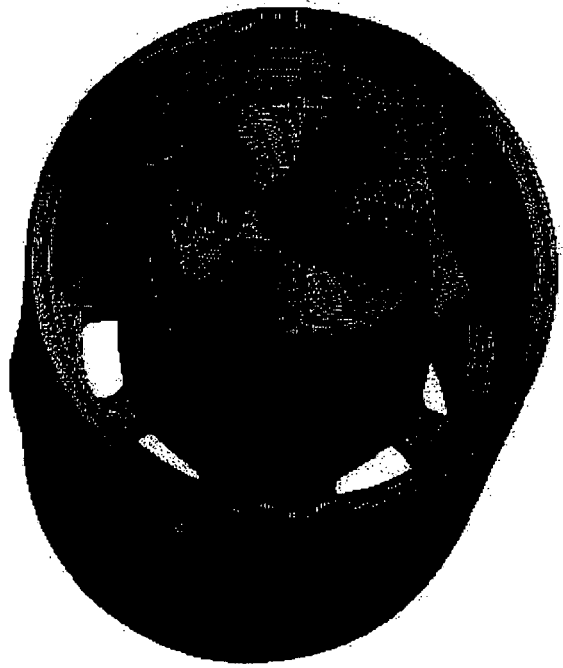
Figure 9:
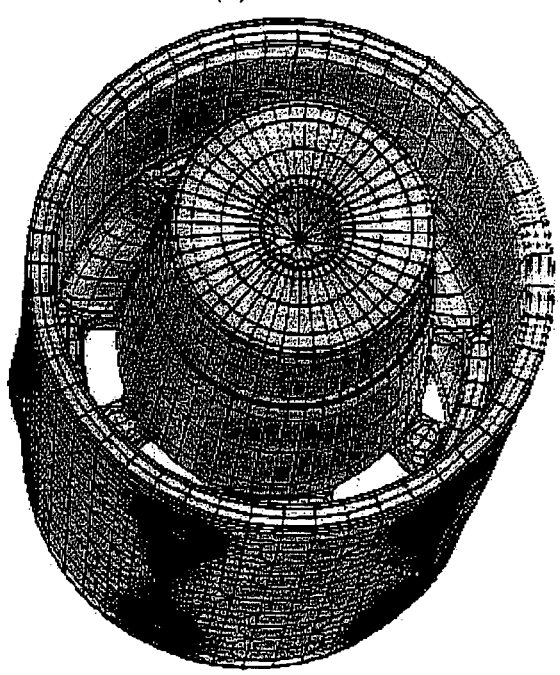

FIGS. 7, 8, and 9 compare conventional uniform Catmull-Clark subdivision with the adaptive subdivision method of the present invention. Referring to FIG. 7 showing a rocker arm, uniform Catmull-Clark subdivision resulted in 22,656 vertices, 45,312 edges, and 22,656 faces (FIG. 7*c*) for an error of 0.25. In contrast, the adaptive subdivision method of the present invention (FIG. 7*d*) generated 2,706 vertices, 5,412 edges, and 2,706 faces, i.e. only 3/25 of the total vertices, edges, and faces required for conventional Catmull-Clark subdivision. Lowering the error tolerance to 0.2 resulted in a maximum subdivision depth of 4. In this latter case, uniform Catmull-Clark subdivision generated 362,496 vertices, 724,992 edges, and 362,496 faces. In comparison, the label-driven adaptive subdivision method of this invention generated only 9,022 vertices, 18,044 edges, and 9,022 faces, or a 40× improvement on the total number of vertices, faces, and edges.

FIG. 8 depicts a ventilation controller component. For an error tolerance of 0.15, the maximum subdivision depth of the mesh faces in the input control mesh was 3. Uniform Catmull-Clark subdivision (FIG. 8*c*) generated 388,068 vertices, 776,192 edges, and 388,096 faces. In contrast, the method of the present invention required only 9814 vertices, 19,684 edges, and 9,842 faces. The reason that adaptive subdivision was performed in some of the flatter regions was that those regions contained extraordinary vertices.

A marker cap is depicted in FIG. 9. For an error tolerance of 0.1, the maximum subdivision depth of the mesh faces was 3. Uniform Catmull-Clark subdivision generated 273, 398 vertices, 546,816 edges, and 273,408 faces (FIG. 9*c*). FIG. 9*d* shows that the label-driven adaptive subdivision method of the present invention generated only 15,086 vertices, 30,192 edges, and 15096 faces, an 18× improvement over the conventional method. Because the control mesh of the marker cap included more extraordinary vertices, and therefore required additional subdivision in the regions containing the extraordinary vertices, the savings was less than that shown in FIGS. 7 and 8. Notwithstanding, the present method represents an extraordinary savings in the number of vertices, edges, and faces required (compared to conventional Catmull-Clark subdivision) regardless of the complexity of the surface.

Accordingly, the present invention provides a significant improvement over conventional subdivision surface methodology. The subdivision depth computation step provides a precision/error control tool for all tessellation-based applications of subdivision surfaces. The label-driven adaptive subdivision step improves efficiency of all tessellation-based applications and data communication by significantly reducing the number of faces in the resultant mesh while satisfying the desired precision requirement.

Appendix A: Proof of Lemma 3

It is sufficient to show that, for each positive integer i, one has $$M_{0,0}^{i+1} \leq \tfrac{1}{4} M_{0,0}^i. \qquad (37)$$

The sixteen second order forward differences involved in $M^{i+1}_{0,0}$ can be classified into four categories: (C-1) F-E-F, (C-2) E-F-E, (C-3) E-V-E, and (C-4) V-E-V, based on the type of the vertices. For instance, a second order forward difference is said to be in the first category if an edge vertex is sandwiched by two face vertices, such as $2V^{i+1}_{1,0} - V^{i+1}_{0,0} - V^{i+1}_{2,0}$. Each category consists of four second order forward differences. We need to show that all these categories satisfy (37). In the following, we prove (37) for one item of each category. The proof of the other items is similar.

$(F - E - F)$: consider $2V_{0,1}^{i+1} - V_{0,2}^{i+1} - V_{0,0}^{i+1}$. (38)

$$\|2V_{0,1}^{i+1} - V_{0,2}^{i+1} - V_{0,0}^{i+1}\| = \left\|\frac{1}{8}(2V_{0,1}^i - V_{0,2}^i - V_{0,0}^i) + \frac{1}{8}(2V_{1,1}^i - V_{1,2}^i - V_{1,0}^i)\right\| \leq$$

$$\frac{1}{8}M_{0,0}^i + \frac{1}{8}M_{0,0}^i = \frac{1}{4}M_{0,0}^i.$$

Case 1

$(E - F - E)$: consider $2V_{0,2}^{i+1} - V_{0,3}^{i+1} - V_{0,1}^{i+1}$. (39)

$$\|2V_{0,2}^{i+1} - V_{0,3}^{i+1} - V_{0,1}^{i+1}\| = \left\|\frac{1}{16}(2V_{0,2}^i - V_{0,3}^i - V_{0,1}^i + 2V_{0,1}^i - V_{0,2}^i - V_{0,0}^i + 2V_{1,2}^i - V_{1,3}^i - V_{1,1}^i + 2V_{1,1}^i - V_{1,2}^i - V_{1,0}^i)\right\| \leq$$

$$\frac{1}{16}M_{0,0}^i + \frac{1}{16}M_{0,0}^i + \frac{1}{16}M_{0,0}^i + \frac{1}{16}M_{0,0}^i = \frac{1}{4}M_{0,0}^i.$$

Case 2

$(E - V - E)$: consider $2V_{1,1}^{i+1} - V_{1,2}^{i+1} - V_{1,0}^{i+1}$. (40)

$$\|2V_{1,1}^{i+1} - V_{1,2}^{i+1} - V_{1,0}^{i+1}\| = \left\|\frac{1}{32}(2V_{0,1}^i - V_{0,2}^i - V_{0,0}^i) + \frac{3}{15}(2V_{1,1}^i - V_{1,2}^i - V_{1,0}^i) + \frac{1}{32}(2V_{2,1}^i - V_{2,2}^i - V_{2,0}^i)\right\| \leq$$

$$\frac{1}{32}M_{0,0}^i + \frac{3}{16}M_{0,0}^i + \frac{1}{32}M_{0,0}^i = \frac{1}{4}M_{0,0}^i.$$

Case 3

$(V - E - V)$: consider $2V_{1,2}^{i+1} - V_{1,3}^{i+1} - V_{1,1}^{i+1}$. (41)

$$\|2V_{1,2}^{i+1} - V_{1,3}^{i+1} - V_{1,1}^{i+1}\| = \left\|\frac{1}{64}(2V_{0,2}^i - V_{0,3}^i - V_{0,1}^i + 2V_{0,1}^i - V_{0,2}^i - V_{0,0}^i) + \frac{3}{32}(2V_{1,2}^i - V_{1,3}^i - V_{1,1}^i + 2V_{1,1}^i - V_{1,2}^i - V_{1,0}^i) + \frac{1}{64}(2V_{2,2}^i - V_{2,3}^i - V_{2,1}^i + 2V_{2,1}^i - V_{2,2}^i - V_{2,0}^i)\right\| \leq \left(\frac{1}{64} + \frac{1}{64} + \frac{3}{32} + \frac{3}{32} + \frac{1}{64} + \frac{1}{64}\right)M_{0,0}^i = \frac{1}{4}M_{0,0}^i.$$

Case 4

This completes the proof of the lemma.

Appendix B: Convergence of $V''_{2N+2}, \ldots, V''_{2N+8}$

Note that if one can prove that $$\lim_{n \to \infty} (T)^n = \lim_{n \to \infty} \begin{pmatrix} \overline{T} & 0 \\ \overline{T}_{1,1} & \overline{T}_{1,2} \end{pmatrix}^n = T^* \equiv \begin{pmatrix} T^* & 0 \\ T^*_{1,1} & 0 \end{pmatrix}$$ (42)

where $T^*$ is defined in (15) and $T^*_{1,1}$ is a $7 \times (2N+1)$ version of $T^*$, i.e.

$$T^*_{1,1} = \begin{pmatrix} \Delta_1 & \Delta_2 & \cdots & \Delta_{2N+1} \\ \Delta_1 & \Delta_2 & \cdots & \Delta_{2N+1} \\ \vdots & \vdots & \ddots & \vdots \\ \Delta_1 & \Delta_2 & \cdots & \Delta_{2N+1} \end{pmatrix}_{7 \times (2N+1)},$$ (43)

then, by (9) we have $$V_j^n \to V_1^* \equiv \Delta_1 V_1 + \Delta_2 V_2 + \ldots + \Delta_{2N+1} V_{2N+1}$$

for $j=2N+2, 2N+3, \ldots, 2N+8$. Hence, to prove that $V''_{2N+2}, \ldots, V''_{2N+8}$ converge to $V^*_1$, it is sufficient to show that (42) is true, or, equivalently, to show that (i) $(\overline{T}_{1,2})^n$ converges to a $7 \times 7$ zero matrix when n tends to infinity, and (ii) the lower-left $7 \times (2N+1)$ block of $(T)^{2n}$ converges to $T^*_{1,1}$. (I) is obvious because $\overline{T}_{1,2}$ contains non-negative entries and the sum of each row is smaller than one. To prove (ii), note that the sum of each row of $(7)^n$ is one and, from (i), $$(\overline{T}_{1,2})^n \to 0.$$

Therefore, for each of the last 7 rows of $(T)^n$, the sum of the first $2N+1$ entries is close to one when n is large. On the other hand, when n is large, (15) is true, i.e. each column of $(T)^n$ has almost identical entries. Hence, computing an entry of the lower-left $7 \times (2N+1)$ block of $(T)^{2n}=(T)^n(T)^n$ is like multiplying $2N+1$ almost identical entries (in the same column of the upper-left $(2N+1) \times (2N+1)$ block of the second $(T)^n$ by $2N+1$ non-negative numbers whose sum is close to one (in the same row of the lower-left $7 \times (2N+1)$ block of the first $(T)^n$. Consequently the value of that entry in the lower-left $7 \times (2N+1)$ block of $(T)^{2n}=(T)^n (T)^n$ is close to the first $2N+1$ almost identical entries in the same column of the second $(T)^n$ and this completes the proof of (ii).

Appendix C: Rate of Convergence of $\Phi_j^k$

In this appendix we prove Lemma 5. Since $\Phi_j^k$ is symmetric to $\Phi_3^k$, we only need to consider $G_0^k$, $G_2^k$, and $G_3^k$ for the lemma.

(i) $G_0^k$. For an edge point such as $V_4^{i+1}$, we have $$\|V_1^{i+1} - V_4^{i+1}\| = \left\|\sum_{j=4}^{N} \frac{3}{2N^2}(V_{2j}^i - V_1^i) + \sum_{j=3}^{N} \frac{1}{4N^2}(V_{2j+1}^i - V_1^i) + \left(\frac{3}{2N^2} - \frac{1}{16}\right)(V_2^i - V_1^i) + \left(\frac{1}{4N^2} - \frac{1}{16}\right)(V_3^i - V_1^i) + \left(\frac{3}{2N^2} - \frac{3}{8}\right)(V_4^i - V_1^i) + \left(\frac{1}{4N^2} - \frac{1}{16}\right)(V_5^i - V_1^i) + \left(\frac{3}{2N^2} - \frac{1}{16}\right)(V_6^i - V_1^i)\right\| \leq \left[\sum_{j=4}^{N} \frac{3}{2N^2} + \sum_{j=3}^{N} \frac{1}{4N^2} + \left|2\left(\frac{3}{2N^2} - \frac{1}{16}\right)\right| + \left(\frac{3}{8} - \frac{3}{2N^2}\right) + 2\left(\frac{1}{16} - \frac{1}{4N^2}\right)\right]G_0^i$$ (44)

$$= \begin{cases} \left(\frac{3}{8} + \frac{7}{4N} - \frac{4}{N^2}\right)G_0^i, & \text{if } N = 3 \\ \left(\frac{5}{8} + \frac{7}{4N} - \frac{10}{N^2}\right)G_0^i, & \text{if } N \geq 5 \end{cases}$$

where $G_0^i$ is defined in (20).

For a face point such as $V^{i+1}{}_3$, we have $$\|V_1^{i+1} - V_3^{i+1}\| = \left\|\sum_{j=3}^{N}\frac{3}{2N^2}(V_{2j}^i - V_1^i) + \right.\quad(45)$$

$$\sum_{j=3}^{N}\frac{1}{4N^2}(V_{2j+1}^i - V_1^i) + \left(\frac{3}{2N^2} - \frac{1}{4}\right)(V_2^i - V_1^i) +$$

$$\left(\frac{1}{4N^2} - \frac{1}{4}\right)(V_3^i - V_1^i) + \left(\frac{3}{2N^2} - \frac{1}{4}\right)(V_4^i - V_1^i) \le \left[\sum_{j=3}^{N}\frac{3}{2N^2} + \right.$$

$$\left.\sum_{j=2}^{N}\frac{1}{4N^2} + 2\left(\frac{1}{4} - \frac{3}{2N^2}\right) + \frac{1}{4} - \frac{1}{4N^2}\right]G_0^i =$$

$$\left(\frac{3}{4} + \frac{7}{4N} - \frac{13}{2N^2}\right)G_0^i, \quad N = 3 \text{ or } N \ge 5.$$

The other cases are similar to (44) or (45). Hence, we have the following inequality for N=3 or N≥5:

$$G_0^{i+1} \le \left(\frac{3}{4} + \frac{7}{4N} - \frac{13}{2N^2}\right)G_0^i \le \left(\frac{3}{4} + \frac{7}{4N} - \frac{13}{2N^2}\right)^{i+1}G_0^0. \quad(46)$$

(ii) $G^k{}_3$. For an edge point such as $V^{i+1}{}_{2N+8}$, we have $$\|V_4^{i+1} - V_{2N+8}^{i+1}\| = \left\|\frac{1}{16}(V_{2N+8}^i + V_{2N+7}^i - V_6^i - V_5^i) + \frac{5}{16}(V_3^i - V_1^i)\right\| \le \quad(47)$$

$$\left\|\frac{1}{16}(V_{2N+8}^i - V_4^i) + \frac{1}{16}(V_{2N+7}^i - V_4^i) + \frac{1}{16}(V_4^i - V_6^i) + \right.$$

$$\left.\frac{1}{16}(V_4^i - V_5^i) + \frac{5}{16}(V_3^i - V_1^i)\right\| \le \frac{9}{16}\max\{G_0^i, G_3^i\}$$

where $G^i{}_0$ and $G^i{}_3$ are defined in (20).

For a face point such as $V^{i+1}{}_3$, we have $$\|V_4^{i+1} - V_3^{i+1}\| = \left\|\frac{3}{16}(V_2^i + V_3^i) - \frac{1}{16}(V_6^i + V_5^i) - \frac{1}{8}(V_1^i + V_4^i)\right\| \le \quad(48)$$

$$\left\|\frac{3}{16}(V_2^i - V_1^i) + \frac{3}{16}(V_3^i - V_4^i) + \frac{1}{16}(V_1^i - V_6^i) + \frac{1}{16}(V_4^i - V_5^i)\right\| \le$$

$$\frac{1}{2}\max\{G_0^i, G_3^i\}.$$

For a vertex point such as $V^{i+1}{}_{2N+7}$, we have $$\|V_4^{i+1} - V_{2N+7}^{i+1}\| = \quad(49)$$

$$\left\|\frac{3}{16}\left(V_4^i - \frac{9}{32}V_1^i + \frac{1}{32}(V_3^i + V_5^i) + \frac{3}{32}V_{2N+7}^i - \frac{3}{64}(V_6^i + V_2^i)\right) + \right.$$

$$\left.\frac{1}{64}(V_{2N+8}^i + V_{2N+6}^i)\right\| \le$$

$$\left\|\frac{1}{64}(V_{2N+8}^i - V_4^i) + \frac{3}{32}(V_{2N+7}^i - V_4^i) + \frac{1}{64}(V_{2N+6}^i - V_4^i) + \right.$$

$$\frac{9}{32}(V_4^i - V_1^i) + \frac{3}{64}(V_1^i - V_6^i) + \frac{3}{64}(V_1^i - V_2^i) +$$

-continued $$\frac{1}{32}(V_3^i - V_1^i) + \frac{1}{32}(V_5^i - V_1^i) \le \frac{9}{16}\max\{G_0^i, G_3^i\}.$$

The other cases are similar to these cases. Hence, by combining the results of (47), (48), and (49), we have $$G_3^{i+3} \le \frac{9}{16}\max\{G_0^i, G_3^i\} \le \frac{9}{16}\left(\frac{3}{4} + \frac{7}{4N} - \frac{13}{2N^2}\right)^i\max\{G_0^0, G_3^0\}. \quad(50)$$

The second inequality of (50) follows from (46). (50) works for N=3 or N≥5.

(iii) $G^k{}_2$. For an edge point such as $V^{i+1}{}_{2N+6}$, we have $$\|V_{2N+6}^{i+1} - V_5^{i+1}\| = \quad(51)$$

$$\left\|-\frac{3}{16}(V_1^i + V_6^i) + \frac{1}{8}(V_4^i + V_5^i) + \frac{1}{16}(V_{2N+7}^i + V_{2N+6}^i)\right\| =$$

$$\left\|\frac{3}{16}(V_4^i - V_1^i) + \frac{3}{16}(V_5^i - V_6^i) + \frac{1}{16}(V_{2N+7}^i - V_4^i) + \right.$$

$$\left.\frac{1}{16}(V_{2N+6}^i - V_5^i)\right\| \le \frac{1}{2}\max\{G_1^i, G_2^i, G_3^i\}.$$

For a vertex point such as $V^{i+1}{}_{2N+2}$, we have $$\|V_{2N+2}^{i+1} - V_5^{i+1}\| = \quad(52)$$

$$\left\|\frac{3}{32}(V_{2N+6}^i - V_5^i) - \frac{1}{64}(V_{2N+2}^i - V_5^i) - \frac{3}{32}(V_{2N+3}^i + V_5^i) + \right.$$

$$\frac{1}{64}(V_{2N+4}^i - V_6^i) + \frac{1}{64}(V_{2N+7}^i - V_4^i) + \frac{9}{64}(V_5^i - V_6^i) +$$

$$\left.\frac{9}{64}(V_5^i - V_4^i) + \frac{15}{64}(V_5^i - V_1^i)\right\| \le \frac{3}{4}\max\{G_1^i, G_2^i, G_3^i\}.$$

The other cases are similar to these two cases. Hence, by combining the results of (51), (52), (46), and (50), we have $$G_2^{i+1} \le \frac{3}{4}\max\{G_1^i, G_2^i, G_3^i\} \quad(53)$$

$$\le \begin{cases}\left(\frac{3}{4}\right)^{i+1}G^0, & \text{if } N = 3 \\ \left(\frac{3}{4}\right)\left(\frac{3N^2 + 7N - 26}{4N^2}\right)^i G^0, & \text{if } N \ge 5\end{cases}$$

where $G^0 = \max\{G^0{}_0, G^0{}_1, G^0{}_2, G^0{}_3\}$. The lemma now follows from (46), (50), and (53).

Appendix D: Proof of (27)

The proof of Lemma 3 shows that the norms of most of the second order forward differences of the control points of $\Pi^k{}_3$ satisfy the inequality $$\|2A - B - C\| \le \frac{1}{4}Z_0^{k-1}$$

except $2V^k{}_1 - V^k{}_2 - V^k{}_6$, $2V^k{}_6 - V^k{}_1 - V^k{}_{2N+4}$, and $2V^k{}_4 - V^k{}_1 - V^k{}_{2N+7}$. The last two cases are similar. Hence, we only need consider the first two cases.

In the second case, we have $$\|2V_6^{i+1} - V_1^{i+1} - V_{2N+4}^{i+1}\| =$$

$$\left\| \frac{1}{64N^2} \left\{ N^2(2V_7^i - V_8^i - V_{2N+5}^i) + N^2(2V_5^i - V_{2N+3}^i - V_4^i) + \right. \right.$$

$$6N^2(2V_6^i - V_1^i - V_{2N+4}^i) +$$

$$8\sum_{j=1}^{N} (2V_{2[j\%N+1]}^i - V_{2j+1}^i - V_{2[j\%N+1]}^i) +$$

$$(8N^2 - 56)(-2V_1^i + V_4^i + V_8^i) +$$

$$\left. \left. 56\sum_{j=3}^{N+1} (2V_1^i - V_{2[(j-1)\%N+1]}^i - V_{2[(j+1)\%N+1]}^i) \right\} \right\| \leq$$

$$\left( \frac{1}{4} + \frac{1}{N} - \frac{7}{4N^2} \right) Z_0^i, \quad N = 3 \text{ or } N \geq 5$$

where $Z_0^i$ is the second order norm of $S_0^i$. In the above derivation, $V_8^i$ should be replaced with $V_2^i$ when $N=3$.

In the first case, when $N \geq 5$, we have $$\|2V_1^{i+1} - V_2^{i+1} - V_6^{i+1}\| =$$

$$\frac{1}{16N^2} \left\| \sum_{j=1}^{N} 4(V_{2j-1}^i - 2V_{2j}^i + V_{2j+1}^i) + N^2(2V_2^i - V_{2N+1}^i - V_3^i) + \right.$$

$$N^2(2V_6^i - V_7^i - V_5^i) + (N^2 - 28)(2V_1^i - V_4^i - V_{2N}^i) +$$

$$(N^2 - 28)(2V_1^i - V_4^i - V_8^i) - \sum_{j=5}^{N-1} 28(2V_1^i - V_{2j}^i - V_{2(j-2)}^i) -$$

$$28(2V_1^i - V_{2N-4}^i - V_{2N}^i) - 28(2V_1^i - V_{2N-2}^i - V_2^i) +$$

$$(8N^2 - 28)(2V_1^i - V_2^i - V_6^i) \right\| \leq \begin{cases} \left( \frac{1}{2} + \frac{1}{4N} + \frac{21}{4N^2} \right) Z_0^i, & \text{if } N = 5 \\ \left( \frac{3}{4} + \frac{2}{4N} - \frac{21}{2N^2} \right) Z_0^i, & \text{if } N > 5. \end{cases}$$

In the first summation, one should use $V_{2N+1}^i$ for $V_{2j+1}^i$ when $j=1$. The difference between the case $N=5$ and $N \geq 6$ comes from the fact that $(N^2-28)$ is negative when $N=5$. When $N=3$, we have $$\|2V_1^{i+1} - V_2^{i+1} - V_6^{i+1}\| =$$

$$\frac{1}{144} \|5(2V_2^i - V_3^i - V_7^i) + 5(2V_6^i - V_7^i - V_5^i) - 4(2V_4^i - V_3^i - V_5^i) -$$

$$19(2V_1^i - V_4^i - V_2^i) - 19(2V_1^i - V_4^i - V_6^i) +$$

$$44(2V_1^i - V_2^i - V_6^i)\| \leq \frac{2}{3} Z_0^i, \quad \text{when } N = 3$$

Consequently, from the above results we have the first part of (27). The second part of (27) follows from the observation that the norms of second order forward differences similar to $2V_1^{i+1} - V_2^{i+1} - V_6^{i+1}$ dominates the other second order forward differences in all subsequent norm computation.

The foregoing description is presented for purposes of illustration and description of the various aspects of the invention. The descriptions are not intended to be exhaustive or to limit the invention to the precise form disclosed. The embodiments described above were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for modeling or representing a surface or shape having an arbitrary topology which may be represented by a control mesh comprising at least one discrete Catmull-Clark Subdivision Surface (CCSS) patch defined by a set of control points, comprising the steps of:
    computing a subdivision depth determining the number of recursive subdivisions which may be performed on the control mesh to generate a plurality of finer mesh elements, whereby a distance between each finer mesh element and a corresponding limit surface patch is less than a predetermined error tolerance $\epsilon$; and
    using the computed subdivision depth to construct an adaptively refined mesh that is substantially similar to the control mesh within the range of said predetermined error tolerance $\epsilon$;
    wherein each face of the recursively subdivided control mesh is a quadrilateral and contains up to one extraordinary vertex.

2. The method of claim 1, wherein the limit surface patch is not adjacent to an extraordinary vertex.

3. The method of claim 1, wherein the limit surface patch is adjacent to an extraordinary vertex.

4. The method of claim 2, wherein the limit surface patch is a uniform bicubic B-spline surface patch designated $S(u,v)$.

5. The method of claim 4, including the step of calculating a subdivision depth k defined as k levels of recursive subdivision performed on the control points of the limit surface patch $S(u, v)$ to generate a level k control mesh, wherein k is defined as $k \geq \lceil \log_4 (M^0/3\epsilon) \rceil$, where $M^0$ is the second order norm of $S(u,v)$ and the distance between $S(u,v)$ and the level k control mesh is less than $\epsilon$.

6. The method of claim 3, including the initial step of subdividing the limit surface patch at least twice to define at least one standard uniform bicubic B-spline surface subpatch and up to one extraordinary subpatch that is not a standard uniform bicubic B-spline subpatch, said extraordinary subpatch containing a limit point of up to one extraordinary vertex.

7. The method of claim 6, further including the step of computing a subdivision depth $n_\epsilon$ for the extraordinary subpatch, defined as n levels of recursive subdivision performed on the extraordinary subpatch to generate a level n extraordinary subpatch control mesh, wherein $n_\epsilon$ is defined as $$n_\epsilon \equiv \left\lceil \log_\delta \left( \frac{7G^0}{2\epsilon} \right) \right\rceil, \quad \delta = \begin{cases} \frac{4}{3}, & \text{if } N = 3 \\ \frac{98}{85}, & \text{if } N \geq 5 \end{cases}$$

where $G^0$ is the first order norm of $\Pi^0_0$, $\Pi^0_0$ is a level-0 control point defined as $\{V_i | 1 \leq i \leq 2N+8\}$, $V_i$ is an extraordinary vertex with valence N, and the distance between the level n extraordinary subpatch control mesh and a corresponding bilinear plane defined in the extraordinary subpatch is less than or equal to $\epsilon$ if $n \geq n_\epsilon$.

8. The method of claim 7, further including the step of computing a subdivision depth D by performing D recursive subdivisions on each standard uniform bicubic B-spline subpatch to define a level D control mesh, wherein D is defined as the maximum number of recursive subdivisions which may be performed such that the distance between the standard uniform bicubic B-spline subpatch and the level D control mesh is less than $\epsilon$.

9. The method of claim 1, wherein the step of constructing an adaptively refined mesh comprises the steps of:
  defining a mesh for which subdivision depths have been computed, said mesh comprising a plurality of quadrilateral faces containing up to one extraordinary vertex and having at least one interior face not adjacent a boundary of the control mesh and at least one exterior face adjacent a boundary of the control mesh;
  defining an initial label of the interior face as a non-zero integer k wherein k is the subdivision depth of its corresponding surface patch with respect to $\epsilon$,
  defining an initial label of the exterior face as zero;
  establishing a consistent condition for each face whereby no two adjacent vertices thereof have non-zero labels and no two adjacent vertices thereof have zero labels and further wherein the number of zero labels is maximized, the consistent condition being established by defining a connection supporting graph $G_b$ whose vertices are those of the faces having two adjacent vertices whose labels are zero, selecting a vertex from $G_b$, redefining the selected vertex label to 1, updating $G_b$, and repeating the process until the connection supporting graph contains no further vertices;
  performing a balanced Catmull-Clark subdivision step on any face having two or more nonzero vertex labels;
  performing an unbalanced Catmull-Clark subdivision step on any face having only one vertex with zero label; and
  computing new vertices from the results of the balanced and unbalanced Catmull-Clark subdivision steps to generate at least one new face defining the adaptively refined mesh structure.

10. A computer-readable medium having computer-executable instructions for modeling or representing a surface or shape having an arbitrary topology which may be represented by a control mesh comprising at least one discrete Catmull-Clark Subdivision Surface (CCSS) patch defined by a set of control points, by the steps of:
  computing a subdivision depth determining the number of recursive subdivisions which may be performed on the control mesh to generate a plurality of finer mesh elements, whereby a distance between each finer mesh element and a corresponding limit surface patch is less than a predetermined error tolerance $\epsilon$; and
  using the computed subdivision depth to construct an adaptively refined mesh that is substantially similar to the control mesh within the range of said predetermined error tolerance $\epsilon$;
  wherein each face of the recursively subdivided control mesh is a quadrilateral and contains up to one extraordinary vertex.

11. The computer-readable medium of claim 10, wherein the limit surface patch is not adjacent to an extraordinary vertex.

12. The computer-readable medium of claim 10, wherein the limit surface patch is adjacent to an extraordinary vertex.

13. The computer-readable medium of claim 11, wherein the limit surface patch is a uniform bicubic B-spline surface patch designated S(u,v).

14. The computer-readable medium of claim 13, wherein the computer-readable medium performs the further step of calculating a subdivision depth k defined as k levels of recursive subdivision performed on the control points of the limit surface patch S(u, v) to generate a level k control mesh, wherein k is defined as $k \geq \lceil \log_4(M^0/3\epsilon) \rceil$, where $M^0$ is the second order norm of S(u,v) and the distance between S(u,v) and the level k control mesh is less than $\epsilon$.

15. The computer-readable medium of claim 12, wherein the computer-readable medium performs the initial step of subdividing the limit surface patch at least twice to define at least one standard uniform bicubic B-spline surface subpatch and up to one extraordinary subpatch that is not a standard uniform bicubic B-spline subpatch, said extraordinary subpatch containing a limit point of up to one extraordinary vertex.

16. The computer-readable medium of claim 15, wherein the computer-readable medium performs the further step of computing a subdivision depth $n_\epsilon$ for the extraordinary subpatch, defined as n levels of recursive subdivision performed on the extraordinary subpatch to generate a level n extraordinary subpatch control mesh, wherein $n_\epsilon$ is defined as $$n_\epsilon \equiv \left\lceil \log_\delta\left(\frac{7G^0}{2\epsilon}\right) \right\rceil, \quad \delta = \begin{cases} \frac{4}{3}, & \text{if } N = 3 \\ \frac{98}{85}, & \text{if } N \geq 5 \end{cases}$$

where $G^0$ is the first order norm of $\Pi^0_0$, $\Pi^0_0$ is a level-0 control point defined as $\{V_i | 1 \leq i \leq 2N+8\}$, $V_i$ is an extraordinary vertex with valence N, and the distance between the level n extraordinary subpatch control mesh and a corresponding bilinear plane defined in the extraordinary subpatch is less than or equal to $\epsilon$ if $n \geq n_\epsilon$.

17. The computer-readable medium of claim 16, wherein the computer-readable medium further performs the step of computing a subdivision depth D by performing D recursive subdivisions on each standard uniform bicubic B-spline subpatch to define a level D control mesh, wherein D is defined as the maximum number of recursive subdivisions which may be performed such that the distance between the standard uniform bicubic B-spline subpatch and the level D control mesh is less than $\epsilon$.

18. The computer-readable medium of claim 10, wherein the computer-readable medium constructs an adaptively refined mesh by performing the steps of:
  defining a mesh for which subdivision depths have been computed, said mesh comprising a plurality of quadrilateral faces containing up to one extraordinary vertex and having at least one interior face not adjacent a boundary of the control mesh and at least one exterior face adjacent a boundary of the control mesh;
  defining an initial label of the interior face as a non-zero integer k wherein k is the subdivision depth of its corresponding surface patch with respect to $\epsilon$,
  defining an initial label of the exterior face as zero;

establishing a consistent condition for each face whereby no two adjacent vertices thereof have non-zero labels and no two adjacent vertices thereof have zero labels and further wherein the number of zero labels is maximized, the consistent condition being established by defining a connection supporting graph $G_b$ whose vertices are those of the faces having two adjacent vertices whose labels are zero, selecting a vertex from $G_b$, redefining the selected vertex label to 1, updating $G_b$, and repeating the process until the connection supporting graph contains no further vertices;

performing a balanced Catmull-Clark subdivision step on any face having two or more nonzero vertex labels;

performing an unbalanced Catmull-Clark subdivision step on any face having only one vertex with zero label; and computing new vertices from the results of the balanced and unbalanced Catmull-Clark subdivision steps to generate at least one new face defining the adaptively refined mesh structure.

19. A method for modeling or representing a surface or shape having an arbitrary topology which may be represented by a control mesh comprising at least one discrete Catmull-Clark Subdivision Surface (CCSS) patch defined by a set of control points, comprising the steps of:

computing a subdivision depth determining the number of recursive subdivisions which may be performed on the control mesh to generate a plurality of finer mesh elements, whereby a distance between each finer mesh element and a corresponding limit surface patch that is a uniform bicubic B-spline surface patch $S(u,v)$ is less than a predetermined error tolerance $\epsilon$;

wherein the subdivision depth is calculated as subdivision depth k defined as k levels of recursive subdivision performed on the control points of the limit surface patch $S(u,v)$ to generate a level k control mesh, wherein k is defined as $k \geq \lceil \log_4(M^0/3\epsilon) \rceil$, where $M^0$ is the second order norm of $S(u,v)$ and the distance between $S(u,v)$ and the level k control mesh is less than $\epsilon$; and using the computed subdivision depth to construct an adaptively refined mesh that is substantially similar to the control mesh within the range of said predetermined error tolerance $\epsilon$;

wherein each face of the recursively subdivided control mesh is a quadrilateral and contains up to one extraordinary vertex.

20. The method of claim 19, wherein the limit surface patch is not adjacent to an extraordinary vertex.

21. The method of claim 19, wherein the limit surface patch is adjacent to an extraordinary vertex.

22. The method of claim 21, including the initial step of subdividing the limit surface patch at least twice to define at least one standard uniform bicubic B-spline surface subpatch and up to one extraordinary subpatch that is not a standard uniform bicubic B-spline subpatch, said extraordinary subpatch containing a limit point of up to one extraordinary vertex.

23. The method of claim 22, further including the step of computing a subdivision depth $n_\epsilon$ for the extraordinary subpatch, defined as n levels of recursive subdivision performed on the extraordinary subpatch to generate a level n extraordinary subpatch control mesh, wherein $n_\epsilon$ is defined as $$n_\epsilon \equiv \left\lceil \log_\delta\left(\frac{7G^0}{2\epsilon}\right) \right\rceil, \quad \delta = \begin{cases} \frac{4}{3}, & \text{if } N = 3 \\ \frac{98}{85}, & \text{if } N \geq 5 \end{cases}$$

where $G^0$ is the first order norm of $\Pi^0_0$, $\Pi^0_0$ is a level-0 control point defined as $\{V_i | 1 \leq i \leq 2N+8\}$, $V_i$ is an extraordinary vertex with valence N, and the distance between the level n extraordinary subpatch control mesh and a corresponding bilinear plane defined in the extraordinary subpatch is less than or equal to $\epsilon$ if $n \geq n_\epsilon$.

24. The method of claim 23, further including the step of computing a subdivision depth D by performing D recursive subdivisions on each standard uniform bicubic B-spline subpatch to define a level D control mesh, wherein D is defined as the maximum number of recursive subdivisions which may be performed such that the distance between the standard uniform bicubic B-spline subpatch and the level D control mesh is less than $\epsilon$.

25. The method of claim 19, wherein the step of constructing an adaptively refined mesh comprises the steps of:

defining a mesh for which subdivision depths have been computed, said mesh comprising a plurality of quadrilateral faces containing up to one extraordinary vertex and having at least one interior face not adjacent a boundary of the control mesh and at least one exterior face adjacent a boundary of the control mesh;

defining an initial label of the interior face as a non-zero integer k wherein k is the subdivision depth of its corresponding surface patch with respect to $\epsilon$, defining an initial label of the exterior face as zero;

establishing a consistent condition for each face whereby no two adjacent vertices thereof have non-zero labels and no two adjacent vertices thereof have zero labels and further wherein the number of zero labels is maximized, the consistent condition being established by defining a connection supporting graph $G_b$ whose vertices are those of the faces having two adjacent vertices whose labels are zero, selecting a vertex from $G_b$, redefining the selected vertex label to 1, updating $G_b$, and repeating the process until the connection supporting graph contains no further vertices;

performing a balanced Catmull-Clark subdivision step on any face having two or more nonzero vertex labels;

performing an unbalanced Catmull-Clark subdivision step on any face having only one vertex with zero label; and computing new vertices from the results of the balanced and unbalanced Catmull-Clark subdivision steps to generate at least one new face defining the adaptively refined mesh structure.

* * * * *